United States Patent
Song

(10) Patent No.: US 7,247,411 B2
(45) Date of Patent: *Jul. 24, 2007

(54) LIQUID CRYSTAL DISPLAY

(75) Inventor: Jang-Kun Song, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/713,427

(22) Filed: Nov. 17, 2003

(65) Prior Publication Data

US 2004/0100611 A1 May 27, 2004

Related U.S. Application Data

(63) Continuation of application No. 09/969,717, filed on Oct. 4, 2001, now Pat. No. 6,678,031.

(30) Foreign Application Priority Data

Oct. 4, 2000 (KR) ............... 2000-58288

(51) Int. Cl.
*G02F 1/1335* (2006.01)
*G02F 1/1339* (2006.01)

(52) U.S. Cl. .................. 430/7; 430/321; 349/156

(58) Field of Classification Search .......... 430/7, 430/321; 349/155, 156, 157, 124, 129
See application file for complete search history.

(56) References Cited

U.S. PATENT DOCUMENTS

| | | | | |
|---|---|---|---|---|
| 5,757,451 | A | 5/1998 | Miyazaki et al. | 349/106 |
| 5,917,572 | A | 6/1999 | Kurauchi et al. | 349/156 |
| 6,031,593 | A | 2/2000 | Morikawa et al. | 349/155 |
| 6,072,557 | A | 6/2000 | Kishimoto | 349/156 |
| 6,317,187 | B1 | 11/2001 | Nakajima et al. | 349/155 |
| 6,437,847 | B1 | 8/2002 | Kishimoto | 349/155 |
| 6,455,339 | B1 | 9/2002 | Wu et al. | 438/30 |
| 6,493,057 | B1 | 12/2002 | Sago et al. | 349/153 |
| 6,583,846 | B1 * | 6/2003 | Yanagawa et al. | 349/155 |
| 6,897,918 | B1 * | 5/2005 | Nonaka et al. | 349/106 |
| 2002/0003599 | A1 | 1/2002 | Kadota et al. | 349/155 |
| 2002/0033927 | A1 * | 3/2002 | Mun et al. | 349/156 |
| 2002/0063832 | A1 | 5/2002 | Wu et al. | 349/129 |
| 2004/0075798 | A1 * | 4/2004 | Inoue et al. | 349/129 |
| 2005/0140887 | A1 * | 6/2005 | Song et al. | 349/129 |

FOREIGN PATENT DOCUMENTS

| | | |
|---|---|---|
| EP | 994379 A | 4/2000 |
| JP | 01-254917 | 10/1989 |
| JP | 02-125224 | 5/1990 |
| JP | 11-258605 | 9/1999 |
| JP | 11-352489 A * | 12/1999 |
| JP | 2000-047194 | 2/2000 |
| JP | 2000-047252 | 2/2000 |
| JP | 2000-081623 | 3/2000 |
| JP | 2000-137227 | 5/2000 |

OTHER PUBLICATIONS

English Abstract for Publication No. 01-254917.
English Abstract for Publication No. 02-125224.
English Abstract for Publication No. 11-258605.
English Abstract for Publication No. 2000-047194.
English Abstract for Publication No. 2000-047252.
English Abstract for Publication No. 2000-081623.
English Abstract for Publication No. 2000-137227.

* cited by examiner

*Primary Examiner*—John A. McPherson
(74) *Attorney, Agent, or Firm*—F.Chau & Associates, LLC

(57) ABSTRACT

A liquid crystal display includes a first insulating substrate, thin film transistors formed on the first insulating substrate, and pixel electrodes connected to the thin film transistors each with an opening pattern. A second insulating substrate faces the first insulating substrate. A black matrix and color filters are formed on the second insulating substrate, and a common electrode covers the black matrix and the color filters. A protrusion pattern is formed on the common electrode. The protrusion pattern is pillar-shaped with top and bottom sides. The top and bottom sides of the protrusion pattern are shaped with a circle, a rectangle, or a rectangle with curved edges. The protrusion pattern includes a protrusion having a relatively small thickness, and a protrusion having a relatively large thickness. The former protrusion is used for domain partitioning, and the latter protrusion is used as a spacer. A vertical alignment layer is internally formed on the substrates, and a liquid crystal is injected in-between the substrates. Polarizing plates are externally attached to the substrates, respectively. A bi-axial film and a $\lambda/4$ plate are interposed between the respective substrates and the respective polarizing plates. The bi-axial film and the $\lambda/4$ plate transform the linear-polarizing into a circular-polarizing.

14 Claims, 24 Drawing Sheets

FIG.8
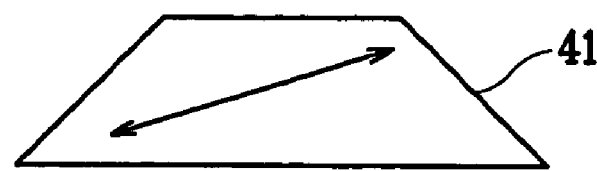
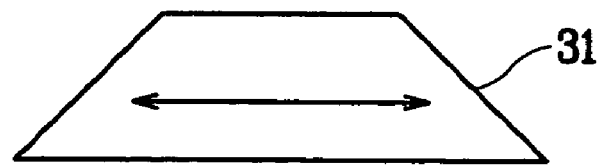
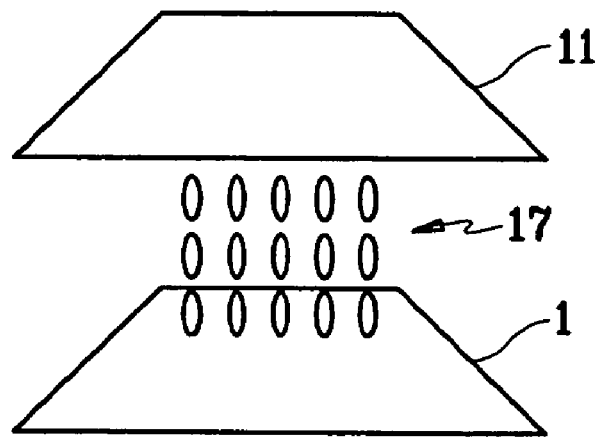
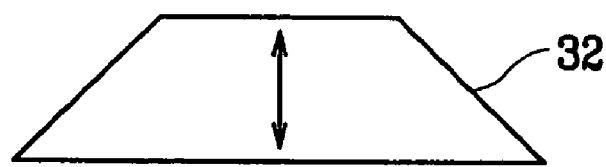
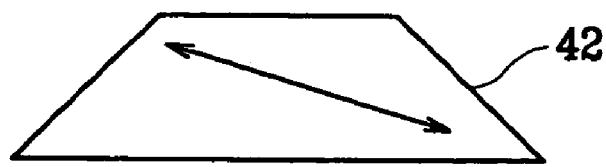

FIG.12A
FIG.12B
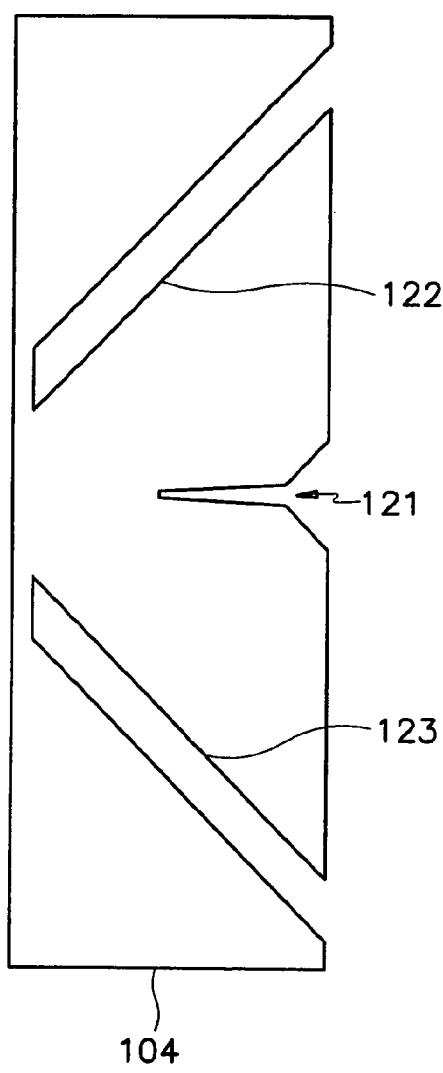
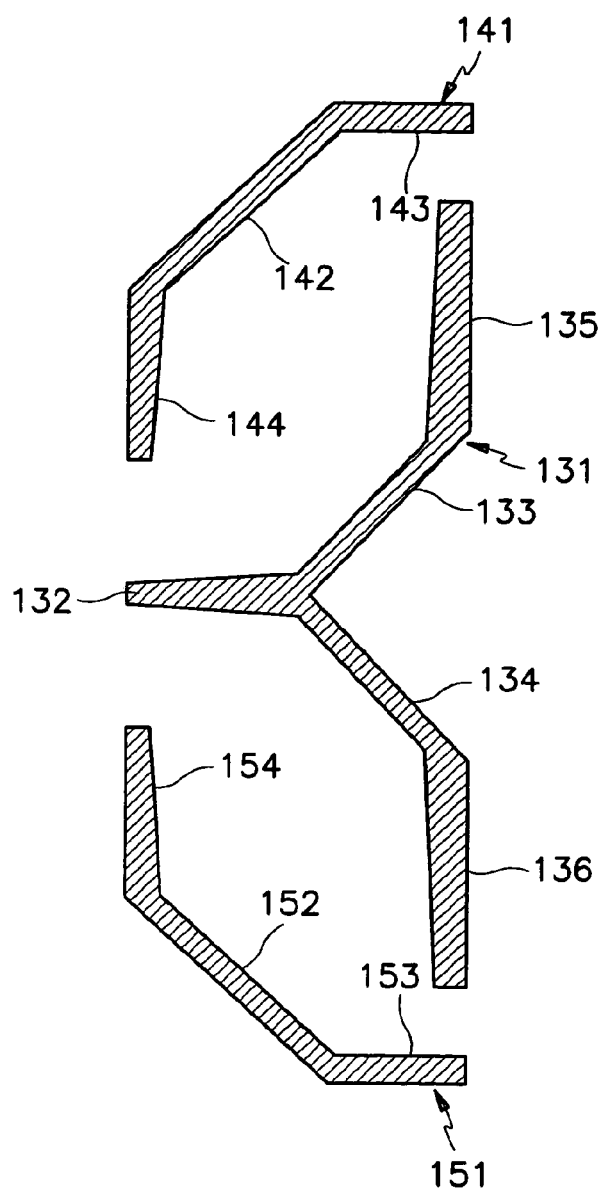

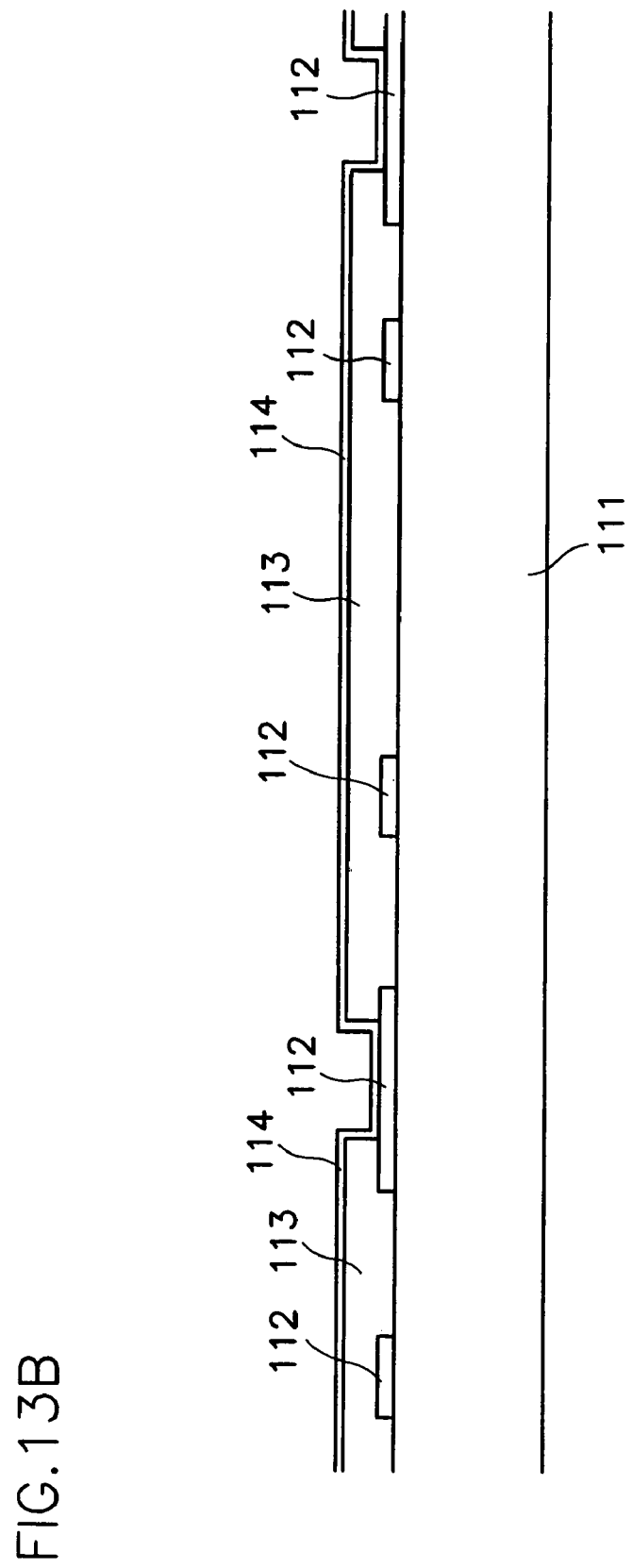

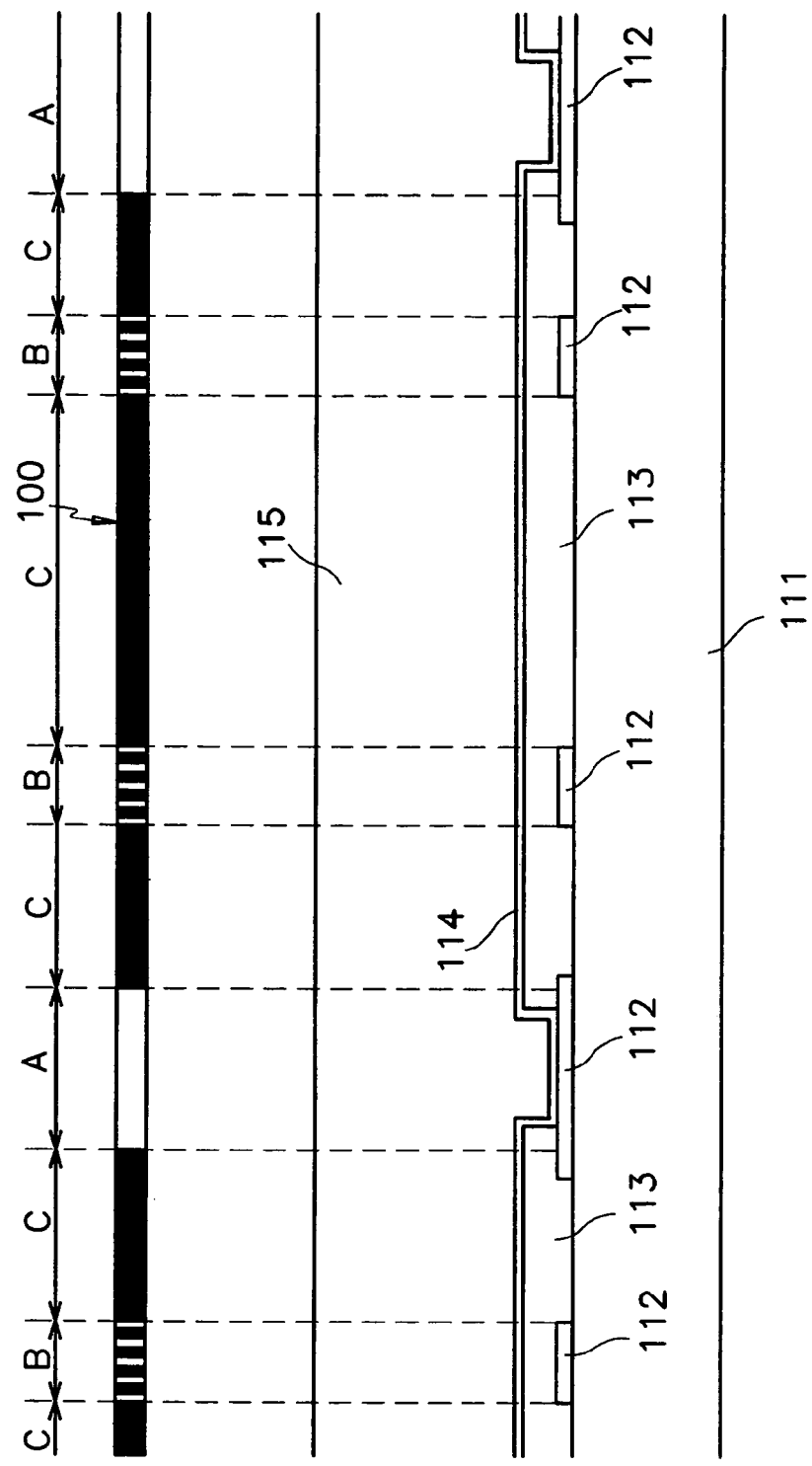

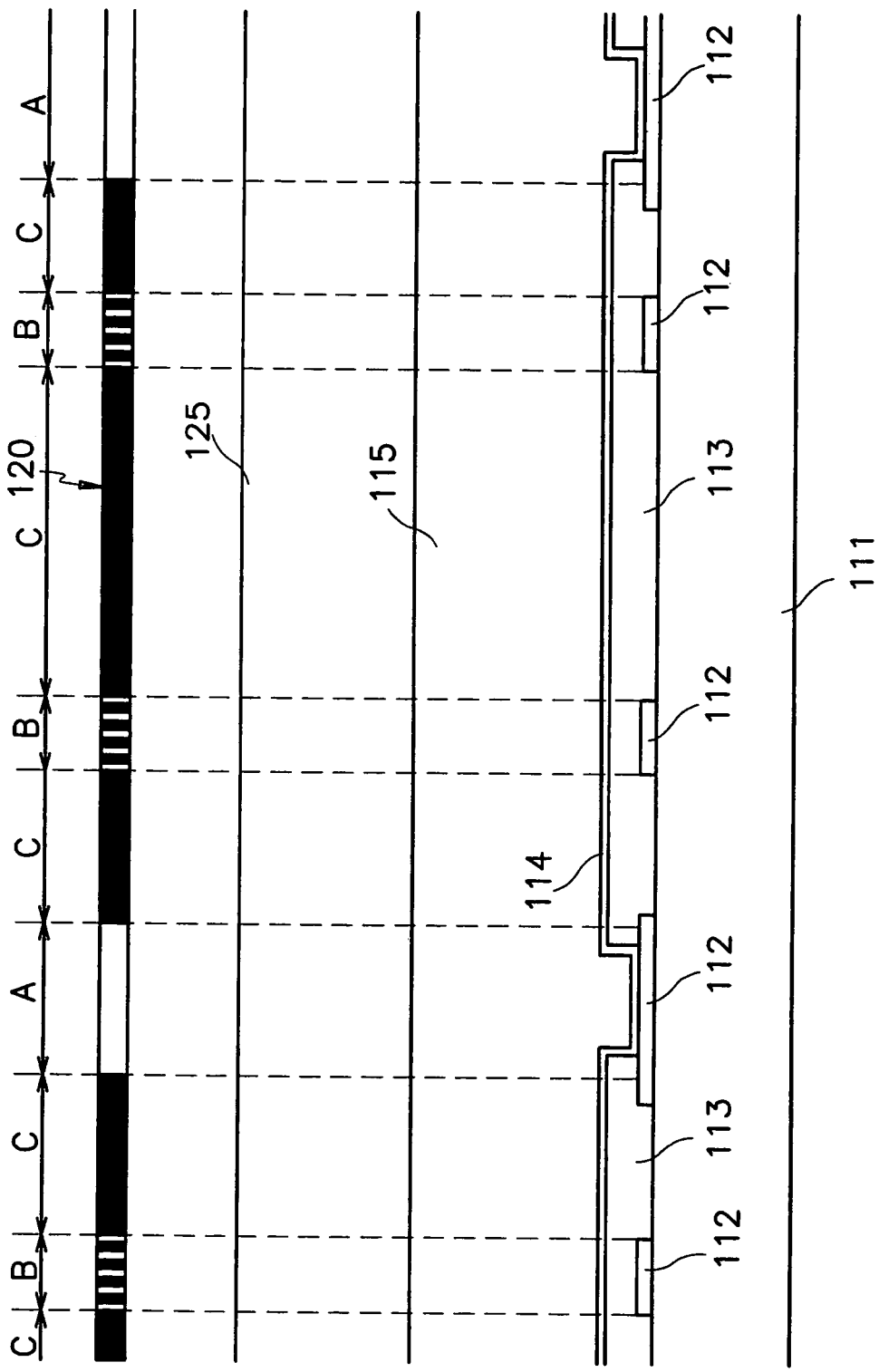

FIG.18A
FIG.18B
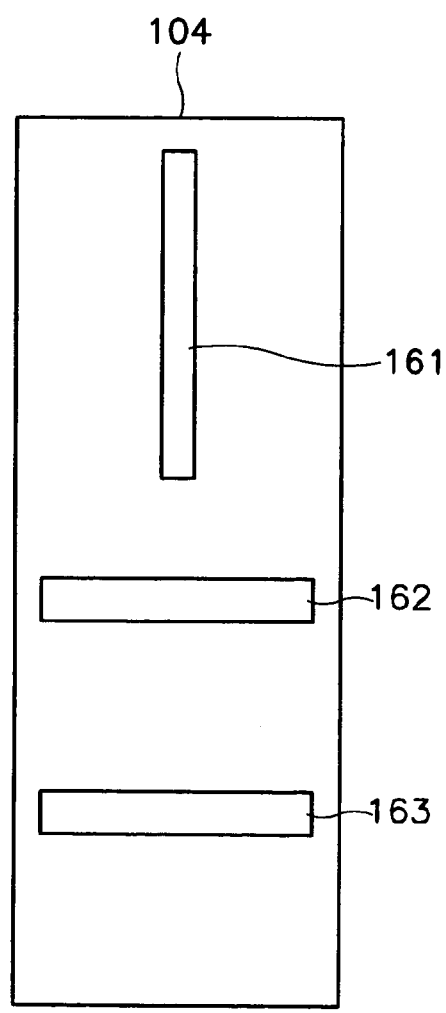
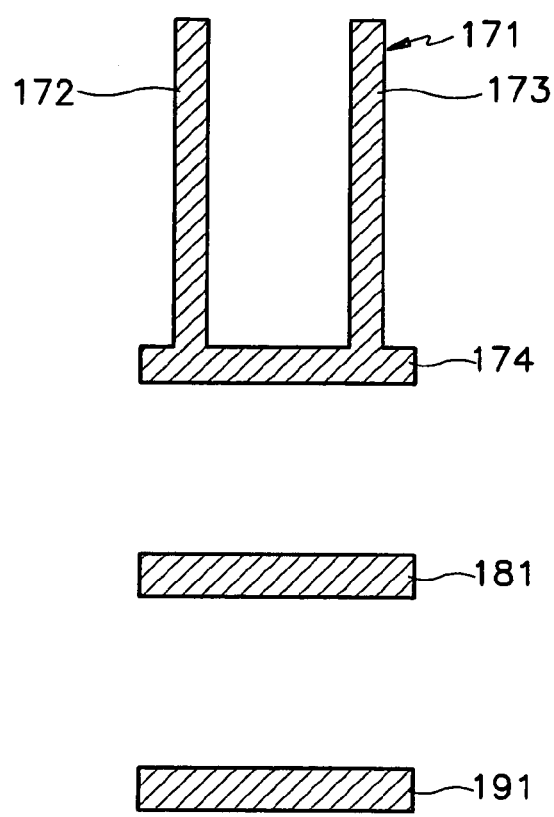

LIQUID CRYSTAL DISPLAY

This is a continuation application of the U.S. patent application Ser. No. 09/969,717 filed Oct. 4, 2001 which has issued as U.S. Pat. No. 6,678,031 on Jan. 13, 2004.

BACKGROUND OF THE INVENTION (a) Field of the Invention

The present invention relates to a liquid crystal display and, more particularly, to a liquid crystal display which bears wide viewing angle.

(b) Description of the Related Art

Generally, a liquid crystal display has two substrates with a plurality of electrodes, a liquid crystal layer sandwiched between the two substrates, and two polarizing plates externally attached to the substrates. Voltages are applied to the electrodes so that the liquid crystal molecules in the liquid crystal layer are re-oriented to thereby control the light transmission.

One of the substrates is formed with thin film transistors for switching the voltages applied to the electrodes, and a plurality of gate and data lines proceeding in the row and column directions. The data lines cross over the gate lines while defining pixel regions. A pixel electrode is formed at each pixel region. The thin film transistors receive scanning signals from the gate lines, and picture signals from the data lines. The thin film transistors control the picture signals pursuant to the scanning signals, and transmit the controlled picture signals to the pixel electrodes. The other substrate is formed with color filters corresponding to the pixel electrodes, and a common electrode at its entire surface.

In a vertically aligned (VA) mode liquid crystal display, the long axes of the liquid crystal molecules are arranged vertical to the substrates without application of an electric field, and under the application of voltages, inclined such that they are disposed to be parallel to the substrates. The liquid crystal molecules where the long axes thereof are oriented vertical to the substrates cannot rotate the polarizing direction of the light, whereas the liquid crystal molecules where the long axes thereof are oriented parallel to the substrates can rotate the polarizing direction of the light, assuming that the polarizing axes of the polarizing plates are arranged vertical to each other. When the liquid crystal molecules are oriented vertical to the substrates, the light does not pass the polarizing plates so that the display screen becomes to be in a dark state. When the liquid crystal molecules are inclined under the application of voltages, a predetermined amount of light passes the polarizing plates so that the display screen becomes to be in a bright state.

In such a VA mode liquid crystal display, it has been proposed that opening patterns or organic material-based protrusions might be formed at the electrodes while forming multiple pixel domains. With the formation of the multiple pixel domains, the liquid crystal molecules are uniformly inclined in four directions, thereby obtaining wide viewing angle.

Meanwhile, such a protrusion may be used as a spacer. The height of the protrusion suitable for the domain partitioning may be established to be about 1.2 µm, but that suitable for the spacer use should be established to be about 4.0 µm. Accordingly, in order to directly use the domain partitioning protrusion as the spacer, the height of the protrusion would be established to be about 4.0 µm. However, in this case, it becomes difficult to inject the liquid crystal material in-between the substrates due to the barrier of the protrusion.

SUMMARY OF THE INVENTION

It is an object of the present invention to provide a liquid crystal display with protrusion patterns which can make the desired domain partitioning while being used for the spacer purpose.

It is another object of the present invention to provide a liquid crystal display which bears enhanced brightness.

These and other objects may be achieved by a liquid crystal display where protrusion patterns are formed to be used as a spacer while making the desired domain partitioning.

According to one aspect of the present invention, the liquid crystal display includes a first insulating substrate, and pixel electrodes formed on the first insulating substrate each with a plurality of opening patterns. The pixel electrode is partitioned into a plurality of micro-regions by way of the opening patterns. A second insulating substrate faces the first insulating substrate. A common electrode is formed on the second insulating substrate. A liquid crystal layer is sandwiched between the first and the second insulating substrates. A plurality of protrusion patterns are formed on the common electrode. The protrusion patterns are placed at the micro-regions of the pixel electrode to regulate the inclining directions of liquid crystal molecules in the liquid crystal layer. The gap between the first and the second substrates is constantly maintained by way of the protrusion patterns.

A thin film transistor is formed on the first insulating substrate while being electrically connected to the pixel electrode. A black matrix is interposed between the second insulating substrate and the common electrode while being patterned. Color filters are interposed between the second insulating substrate and the common electrode corresponding to the pixel electrodes.

The protrusion pattern is shaped with a pillar where the top and the bottom sides thereof have a shape of a circle, a rectangle, or a rectangle with curved edges. The protrusion pattern has a height of 3.0–4.5 µm.

The retardation value of the liquid crystal layer is in the range of 0.25–0.4 µm.

The light incident upon the liquid crystal layer is circularly polarized. First and second polarizing plates are externally attached to the first and the second substrates, and first and second bi-axial films are interposed between the first substrate and the first polarizing plate and between the second substrate and the second polarizing plate, respectively.

A mono-axial film may be interposed either between the first polarizing plate and the first bi-axial film, or between the second polarizing plate and the second bi-axial film.

The longest axis of the first bi-axial film is perpendicular to the longest axis of the second bi-axial film. The polarizing axes of the first and the second polarizing plates are angled with respect to the longest axes of the first and the second bi-axial films by 45°.

First and second $\lambda/4$ plates are interposed between the first substrate and the first bi-axial film and between the second substrate and the second bi-axial film, respectively. The slow axes of the first and the second $\lambda/4$ plates are perpendicular to each other. The polarizing axes of the first and the second polarizing plates are angled with respect to the slow axes of the first and the second $\lambda/4$ plates by 45°.

The polarizing axis of the first polarizing plate is parallel to the longest axis of the first bi-axial film, and the polarizing axis of the second polarizing plate is parallel to the longest axis of the second bi-axial film.

According to another aspect of the present invention, the liquid crystal display includes a first insulating substrate, and pixel electrodes formed on the first insulating substrate each with opening patterns. A second insulating substrate faces the first insulating substrate. A common electrode is formed on the second insulating substrate. First and second protrusions are formed on the common electrode. The first protrusion has a first thickness, and the second protrusion has-a second thickness larger than the first thickness. A liquid crystal layer is sandwiched between the first and the second substrates.

A thin film transistor is formed on the first insulating substrate while being electrically connected to the pixel electrode. A black matrix is interposed between the second substrate and the common electrode while being patterned. Color filters are interposed between the second substrate and the common electrode corresponding to the pixel electrodes.

The first and the second protrusions may be based on a photosensitive organic insulating film, a photoresist film, or a silicon-containing insulating film. The first protrusion has a width of 3–15 µm.

The second protrusion is pillar-shaped with top and the bottom sides having a shape of a polygon or a circle. The top and the bottom sides of the second protrusion have a width of 5–40 µm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein:

FIGS. 7 to 9 are exploded views of liquid crystal displays according to third to fifth preferred embodiment of the present invention;

FIG. 12A is a plan view of a pixel electrode for the liquid crystal display shown in FIG. 11;

FIG. 12B is a plan view of a protrusion pattern formed on a common electrode corresponding to the pixel electrode shown in FIG. 12A;

FIGS. 13A to 13C sequentially illustrate the steps of fabricating the color filter substrate shown in FIG. 11;

FIGS. 14 and 15 illustrate the processing state of the color filter substrate shown in FIG. 11 after the coating of an organic film together with a patterning mask;

FIG. 16 illustrates the processing state of the color filter substrate shown in FIG. 11 after the coating of a silicon-containing insulating film together with a patterning mask;

FIG. 18A is a plan view of a pixel electrode for a liquid crystal display according to a seventh preferred embodiment of the present invention;

FIG. 18B is a plan view of a protrusion pattern formed on a common electrode corresponding to the pixel electrode shown in FIG. 18A.

DETAILED DESCRIPTION OF THE PREFERRED EMBODIMENTS

Preferred embodiments of this invention will be explained with reference to the accompanying drawings.

Figure 1:
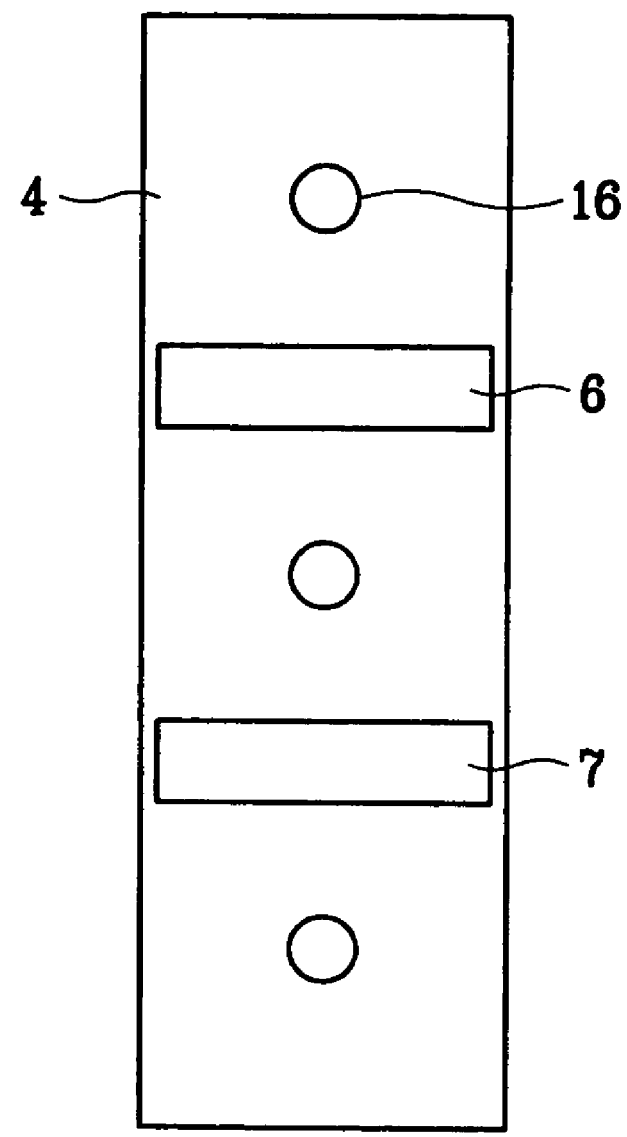
FIG. 1 is a plan view of a liquid crystal display according to a first preferred embodiment of the present invention where a pixel electrode of a thin film transistor array substrate and a protrusion pattern of a color filter substrate are illustrated.
Figure 2A:
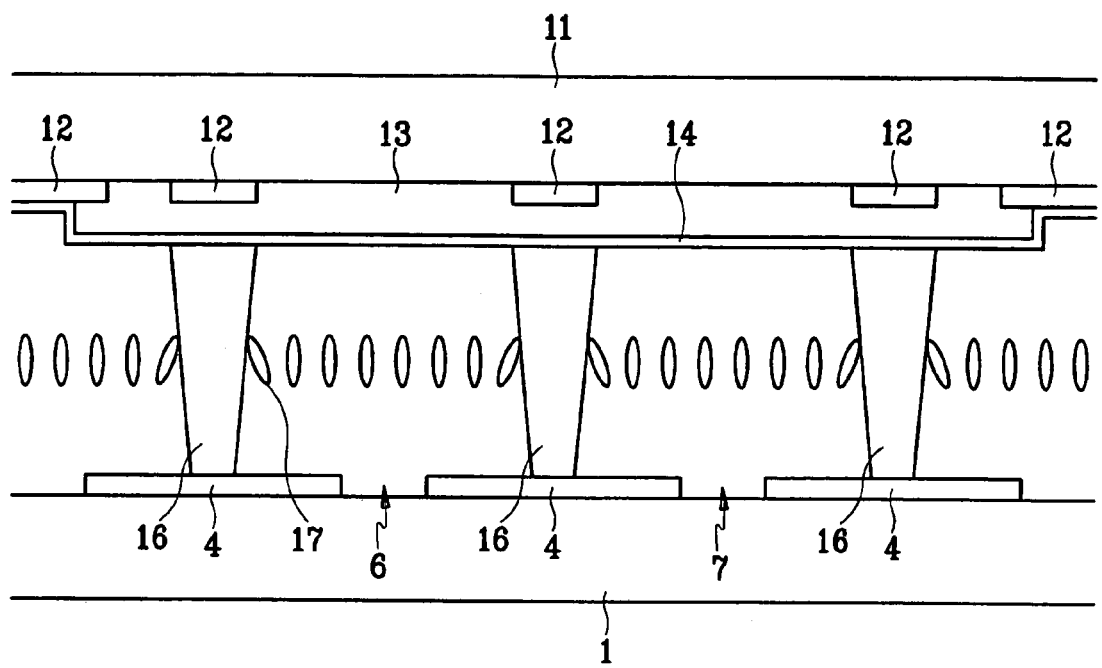
FIG. 2A is a cross sectional view of the liquid crystal display shown in FIG. 1.
Figure 2B:
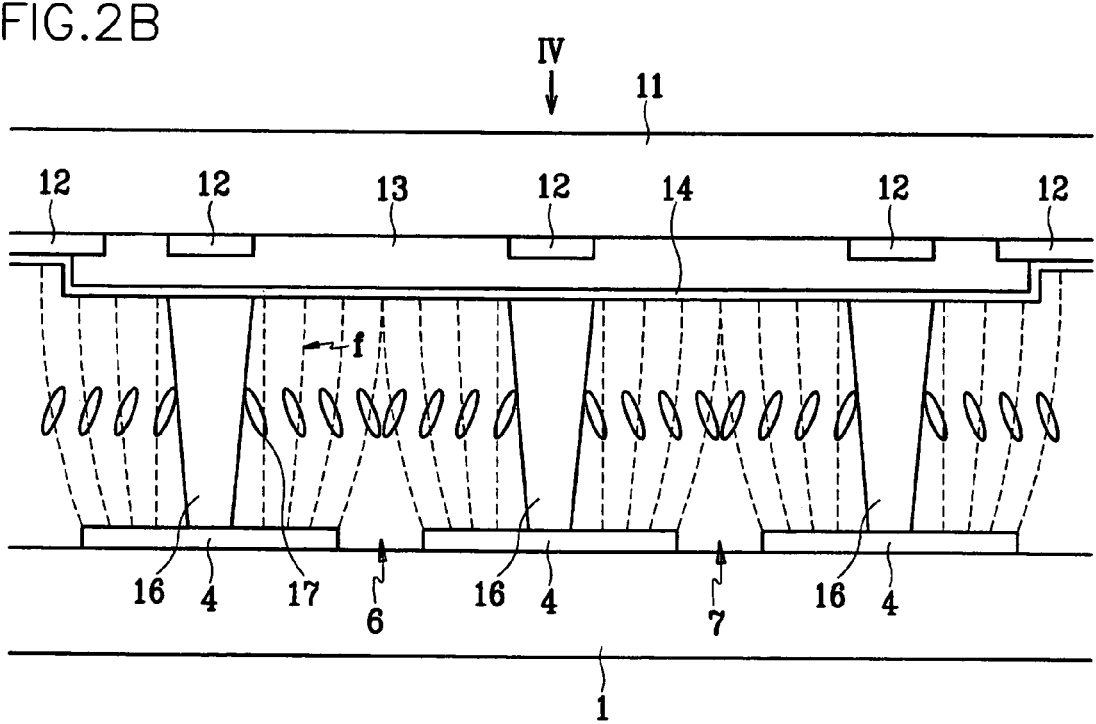
FIG. 2B illustrates the orientation state of liquid crystal molecules in the liquid crystal display shown in FIG. 2A under the application of voltages.
Figure 3:
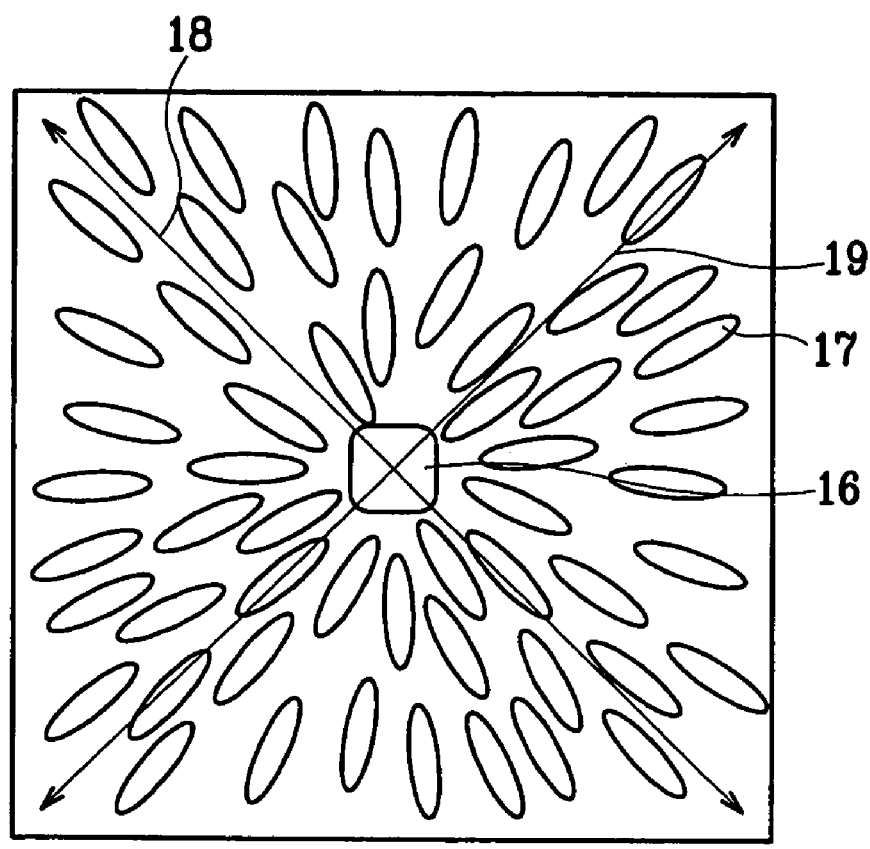
FIG. 3 illustrates the planar orientation state of the liquid crystal molecules shown in FIG. 2B.

FIG. 1 is a plan view of a liquid crystal display according to a first preferred embodiment of the present invention where a pixel electrode of a thin film transistor array substrate and a protrusion pattern of a color filter substrate are illustrated. FIG. 2A is a cross sectional view of the liquid crystal display shown in FIG. 1. FIG. 2B illustrates the orientation state of liquid crystal molecules in the liquid crystal display shown in FIG. 2A under the application of voltages. FIG. 3 illustrates the planar orientation state of the liquid crystal molecules shown in FIG. 2B.

As shown in the drawings, a bottom substrate 1 is overlaid with thin film transistors (not shown) and pixel electrodes 4, and this is called the "thin film transistor array substrate." Each pixel electrode 4 is electrically connected to the thin film transistor while bearing opening portions 6 and 7. A top substrate 11 is overlaid with a black matrix 12, color filters 13 and a common electrode 14, and this is called the "color filter substrate." Polarizing plates (not shown) are externally attached to the substrates 1 and 11 such that the polarizing axes thereof proceed perpendicular to each other.

In the thin film transistor array substrate, the thin film transistor switches the signals applied to the pixel electrode 4. The thin film transistor is formed with several components (not shown) such as a gate electrode being a part of a gate line, a semiconductor layer formed on the gate electrode, a source electrode formed on the semiconductor layer while being a part of a data line, and a drain electrode facing the source electrode around the gate electrode. The drain electrode is electrically connected to the pixel electrode 4.

As shown in FIG. 1, the pixel electrode 4 is divided into three regions around the opening portions 6 and 7.

When the gate signals from the outside are transmitted to the gate lines, and the data signals from the outside are transmitted to the data lines, channels are formed at the semiconductor layer so that the data signals are applied to the pixel electrodes via the drain electrodes, thereby displaying picture images.

In the color filter substrate, the color filters 13 of red, green and blue are positioned at the patterned portions of the black matrix 12. The common electrode 14 is formed on the color filters 13 with a transparent conductive material such as indium tin oxide (ITO) and indium zinc oxide (IZO). A protrusion pattern 16 is formed on the common electrode 14 with a photosensitive organic insulating material. In this preferred embodiment, the protrusion pattern 16 is formed with three protrusions. Each protrusion 16 is pillar-shaped with top and bottom sides of a circle, a rectangle, or a rectangle bearing curved edges. The height of the protrusion 16 is established to be 3.0–4.5 μm. When the two substrates 1 and 11 are arranged for combination, the protrusions 16 are placed at the center of the three pixel electrode regions one by one. The protrusion pattern 16 may be based on a photosensitive organic insulating film, a positive or negative photoresist film, or a silicon-containing insulating film.

A vertical alignment layer (not shown) is formed on the thin film transistor array substrate, and the color filter substrate.

The two substrates 1 and 11 are arranged for combination, and a liquid crystal 17 bearing negative dielectric anisotropy is injected in-between the substrates 1 and 11 to thereby form a liquid crystal layer bearing a retardation value $\Delta$nd of 0.25–0.4 μm. With no application of voltage, the liquid crystal molecules 17 are aligned to be perpendicular to the two substrates 1 and 11. When voltage is applied to the common electrode 14 and the pixel electrodes 4, as shown in FIG. 2B, the liquid crystal molecules 17 are aligned to be perpendicular to the fringe field f formed between the pixel electrodes 4 and the common electrode 14. When viewed from the direction of the IV arrow of FIG. 2B, as shown in FIG. 3, the liquid crystal molecules 17 are aligned in four directions around the protrusion pattern 16 so that the desired multi-domains may be made without patterning the common electrode 14. Since the protrusion pattern 16 is cylindrical-shaped, the injection of the liquid crystal in-between the substrates 1 and 11 can be made in a fluent manner. When the two substrates 1 and 11 are arranged for combination, the protrusion pattern 16 plays a role of a spacer such that the cell gap can be kept in a constant manner.

Figure 4:
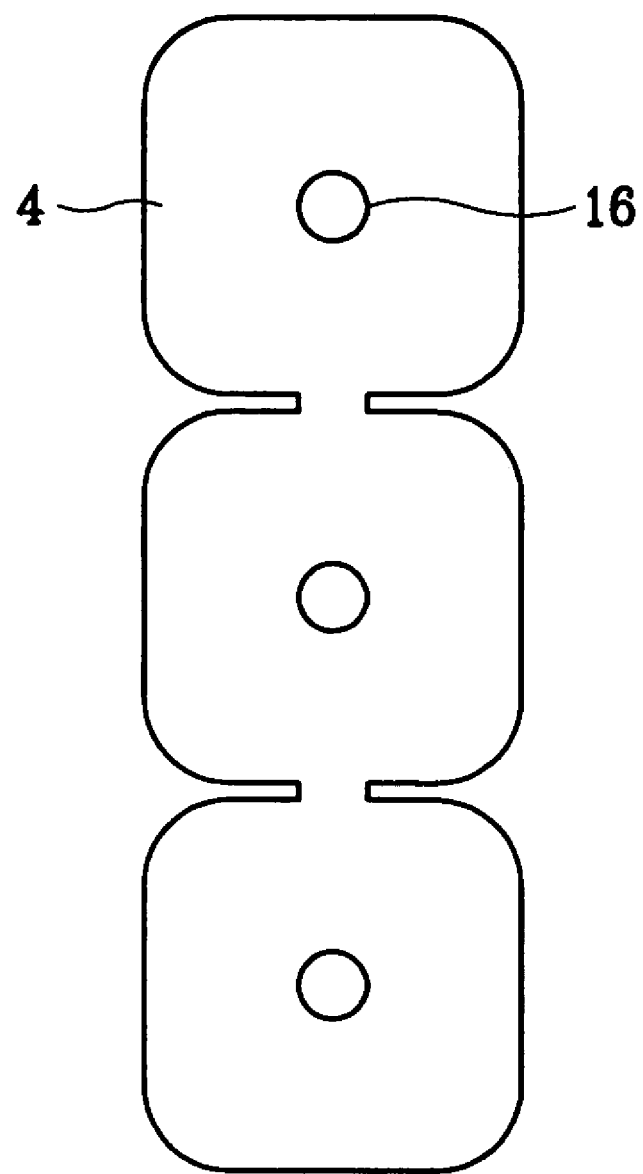
FIG. 4 is a plan view of a liquid crystal display according to a second preferred embodiment of the present invention where a pixel electrode and a protrusion pattern of a thin film transistor array substrate are illustrated.

FIG. 4 is a plan view of a liquid crystal display according to a second preferred embodiment of the present invention where a pixel electrode of a thin film transistor array substrate and a protrusion pattern of a color filter substrate are illustrated. In this preferred embodiment, other components and structures of the liquid crystal display are the same as those related to the first preferred embodiment except that the pixel electrode 4 is shaped in a different manner.

As shown in FIG. 4, the pixel electrode 4 is shaped with a series of rectangles connected to each other. A protrusion 16 is placed at the center of each rectangle. That is, the pixel electrode 4 is divided into a plurality of micro-domains by way of the opening pattern, and the protrusion 16 is positioned at the center of each micro-domain.

A method of fabricating the liquid crystal display will be now explained with reference to FIGS. 5A to 5C.

Figure 5A:
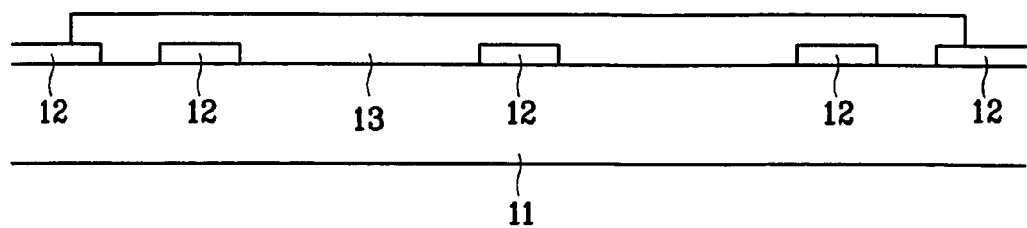
FIGS. 5A to 5C sequentially illustrate the steps of fabricating a color filter substrate for the liquid crystal display shown in FIG. 1 or 4.

First, as shown in FIG. 5A, a black matrix 12 is formed on a substrate 11, and color filters 13 of red, green and blue are formed at the black matrix 12.

Figure 5B:
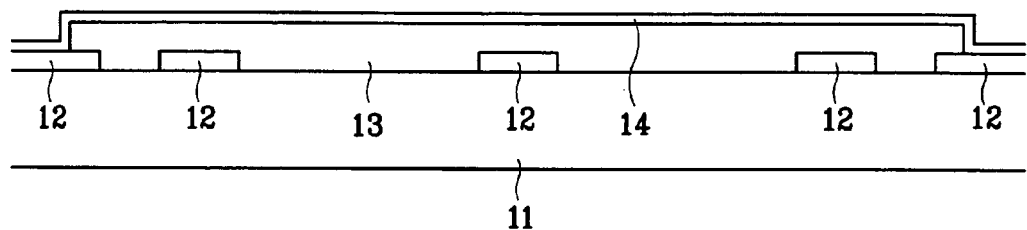

Thereafter, as shown in FIG. 5B, a common electrode 14 is formed on the black matrix 12 and the color filters 13 with a transparent conductive material such as ITO and IZO.

Figure 5C:
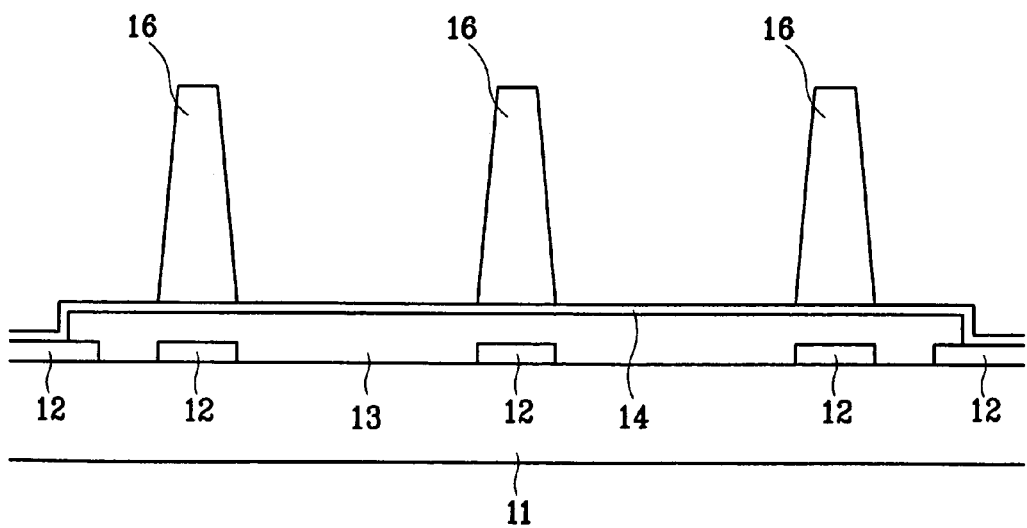

As shown in FIG. 5C, a protrusion pattern 16 is formed on the common electrode 14 on the basis of a photosensitive organic insulating film, a positive or negative photoresist film, or a silicon-containing insulating film. In case the protrusion pattern 16 is based on a photosensitive film, the photosensitive film is exposed to light through a mask, and developed to form the protrusion pattern 16. In case the protrusion pattern 16 is based on a silicon-containing insulating film, the silicon-containing insulating film is overlaid with a photoresist pattern, and etched through the photoresist pattern to form the protrusion pattern 16.

Figure 6:
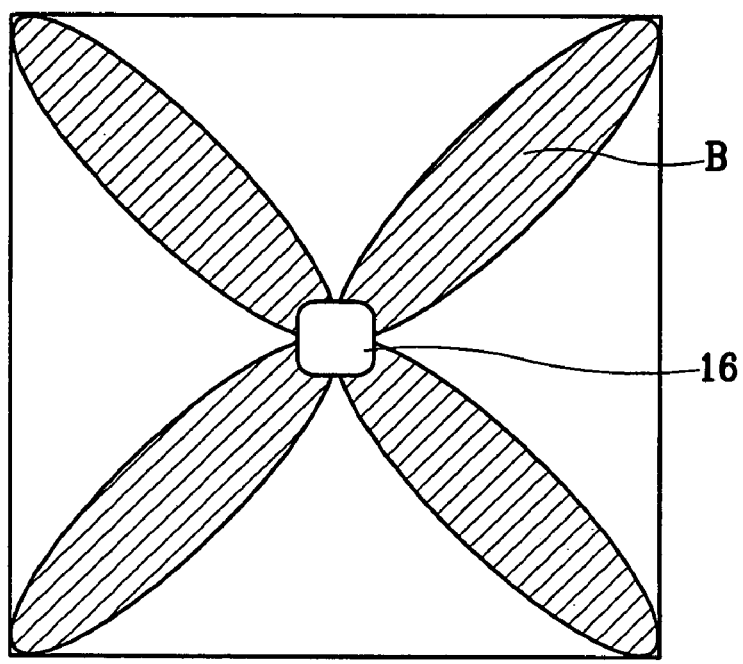
FIG. 6 illustrates occurrence of textures in a usual liquid crystal display under the application of voltages.

Meanwhile, as shown in FIG. 6, in a white state under the application of voltage, a darkish area B is present around the circular protrusion pattern 16 while deteriorating the brightness. The dark area B is made because when the light linearly polarized through the polarizing plate passes the liquid crystal layer, the rotation of the light in the polarizing direction by way of the liquid crystal is not made at the place where the directors of the liquid crystal molecules 17 is parallel to or perpendicular to the polarizing direction of the light. That is, the light linearly polarized through the first polarizing plates directly passes the second polarizing plate without suffering the rotation in the polarizing direction by way of the liquid crystal 17 so that it is intercepted by the second polarizing plate. Accordingly, a compensation plate is preferably provided between the substrates 1 and 11 and the corresponding polarizing plates such that the light can pass them in a state where the linear polarizing is transformed into a circular polarizing. Since the polarizing direction is not fixed at the circular polarizing, such a dark area B where the directors of the liquid crystal molecules 17 are parallel to or perpendicular to the polarizing direction is not made. Consequently, the brightness is enhanced.

Figure 7:
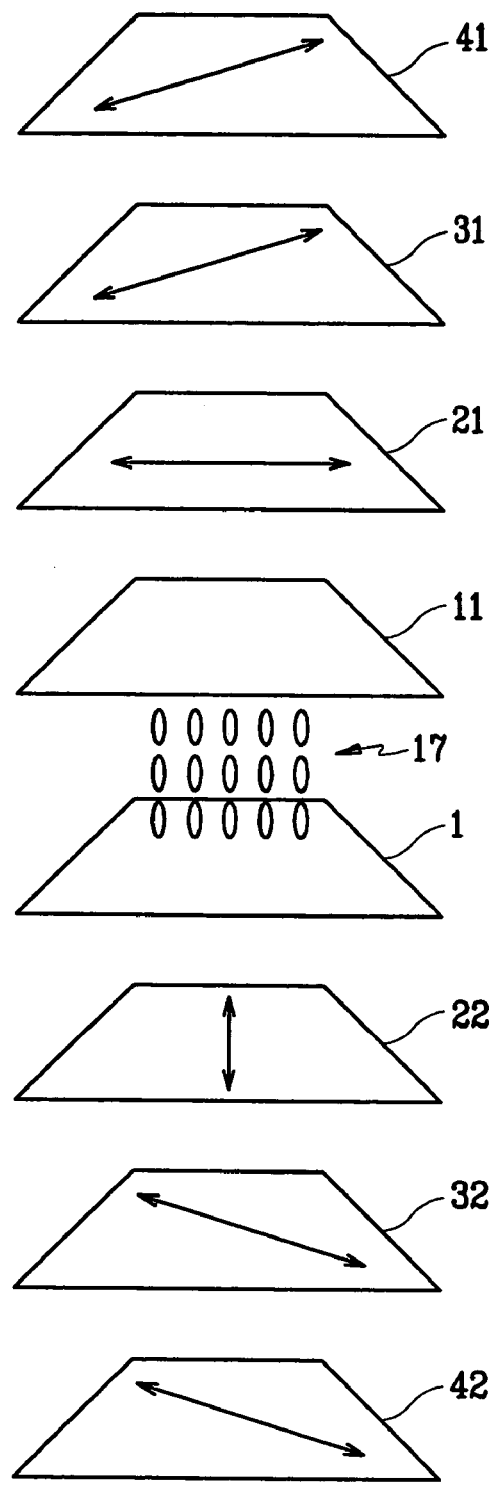

FIG. 7 is an exploded view of a liquid crystal display according to a third preferred embodiment of the present invention. In this preferred embodiment, other components and structures are the same as those related to the first preferred embodiment except that the following components are differentiated.

As shown in FIG. 7, λ/4 plates 21 and 22 are provided between a first polarizing plate 41 and a top substrate 11 and between a second polarizing plate 42 and a bottom substrate 1, respectively. Bi-axial films 31 and 32 are provided between the λ/4 plates 21 and 22 and the polarizing plates 41 and 42, respectively. The polarizing axes of the polarizing plates 41 and 42 are perpendicular to each other, and the largest axes of the bi-axial films 31 and 32 (the axes bearing the greatest index of refraction) are also perpendicular to each other. The slow axes of the λ/4 plates 21 and 22 are also perpendicular to each other. The polarizing axis of the polarizing plate 41 externally attached to the top substrate 11 is parallel to the longest axis of the neighboring bi-axial film 31, and the polarizing axis of the polarizing plate 42 is also parallel to the longest axis of the neighboring bi-axial film 32. Furthermore, the polarizing axes of the polarizing plates 41 and 42 are angled with respect to the slow axes of the neighboring λ/4 plates 21 and 22 by 45°.

The bi-axial films 31 and 32 compensate for the difference in the retardation value to thereby enhance the viewing angle. The plates 21 and 22 transform the linear polarizing through the polarizing plates 41 and 42 into the circular polarizing. That is, when the light circular-polarized through the λ/4 plates 21 and 22 is incident upon the liquid crystal 17, possible occurrence of textures with the linear polarizing is prevented while enhancing the brightness. Furthermore, the viewing angle is compensated due to the bi-axial films 31 and 32. As the slow axes of the λ/4 plates are arranged to be perpendicular to each other while making the desired compensation effect, high contrast ratio can be obtained irrespective of the wavelength diffusion characteristics of the λ/4 plates 21 and 22. When the Rx of the bi-axial films 31 and 32 equals 50 nm and Rz thereof equals 100 nm, the light leakage at the side area is decreased. However, the amount of decrease in the light leakage is not enough to be applied for use in the liquid crystal display.

FIG. 8 is an exploded view of a liquid crystal display according to a fourth preferred embodiment of the present invention.

As shown in FIG. 8, bi-axial films 31 and 32 are provided between a first polarizing plate 41 and a top substrate 11 and between a second polarizing plate 42 and a bottom substrate 1, respectively. The polarizing axes of the first and the second polarizing plates 41 and 42 are perpendicular to each other, and the longest axes of the bi-axial films 31 and 32 are also perpendicular to each other while being angled with respect to the neighboring polarizing plates 41 and 42 by 45°, respectively. The Rx of the bi-axial films 31 and 32 is in the range of 100–150 nm, and the Rz thereof in the range of 80–180 nm. In this preferred embodiment, the bi-axial film also plays the role of a λ/4 plate. That is, the light linear-polarized through the polarizing plate 42 is transformed into a circular-polarized light by way of the bi-axial film 32. After the circular-polarized plate passes the liquid crystal 17, it is transformed into a linear-polarized light by way of the bi-axial film 31. In this case, the viewing angle can be further enhanced compared to that related to the third preferred embodiment.

Figure 9:
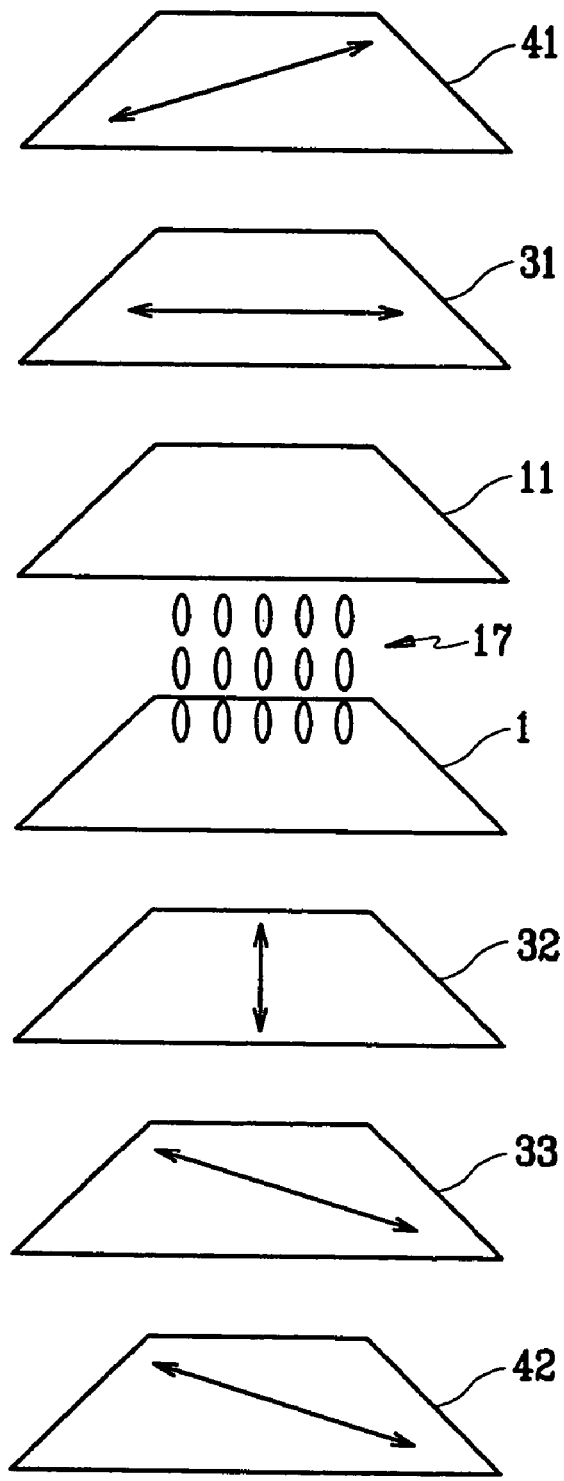

FIG. 9 is an exploded view of a liquid crystal display according to a fifth preferred embodiment of the present invention.

As shown in FIG. 9, bi-axial films 31 and 32 are provided between a first polarizing plate 41 and a top substrate 11 and between a second polarizing plate 42 and a bottom substrate 1, respectively. A mono-axial film 33 is provided between the bi-axial film 32 and the polarizing plate 42. The polarizing axes of the polarizing plates 41 and 42 are perpendicular to each other, and the longest axes of the bi-axial films 31 and 32 are also perpendicular to each other. The longest axes of the bi-axial films 31 and 32 are angled with respect to the polarizing axes of the neighboring polarizing plates 41 and 42 by 45°, respectively. The long axis of the mono-axial film 33 is parallel to the polarizing axis of the neighboring polarizing plate 42. Alternatively, the mono-axial film 33 may be provided between the bi-axial film 31 and the polarizing plate 41, and a bi-axial film bearing a lower bi-axial degree may be used instead of the mono-axial film 33. The Rx of the bi-axial films 31 and 32 is in the range of 100–150 nm, and the Rz thereof in the range of 80–180 nm. The retardation value of the mono-axial film 33 is in the range of 200 nm±100 nm. In this case, the viewing angle can be further enhanced compared to that related to the fourth preferred embodiment.

Figure 10:
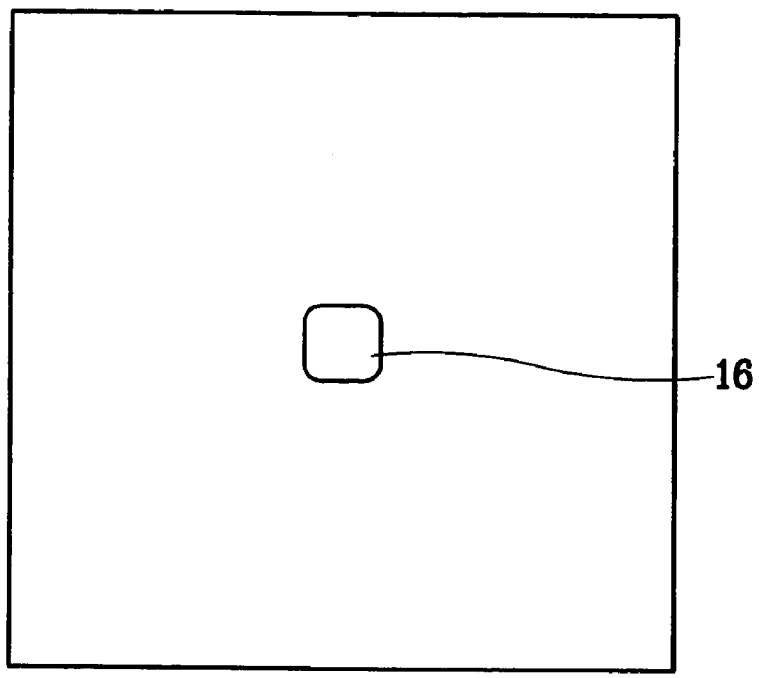
FIG. 10 illustrates occurrence of textures in the liquid crystal display shown in FIG. 1.

As described above, a compensation plate is provided between the polarizing plates 41 and 42 and the substrates 1 and 11 while making circular polarizing, thereby widening the viewing angle. As shown in FIG. 10, any texture is not present at the area except for the protrusion pattern 16, and the brightness is enhanced.

Meanwhile, the protrusion pattern may be differentiated in thickness such that the protrusions bearing a large thickness are used as spacers, and the protrusions bearing a small thickness are used for domain partitioning. In this case, it is preferable that the spacer protrusions and the domain partitioning protrusions should be formed through one photolithography process while reducing the number of relevant processing steps.

Figure 11:
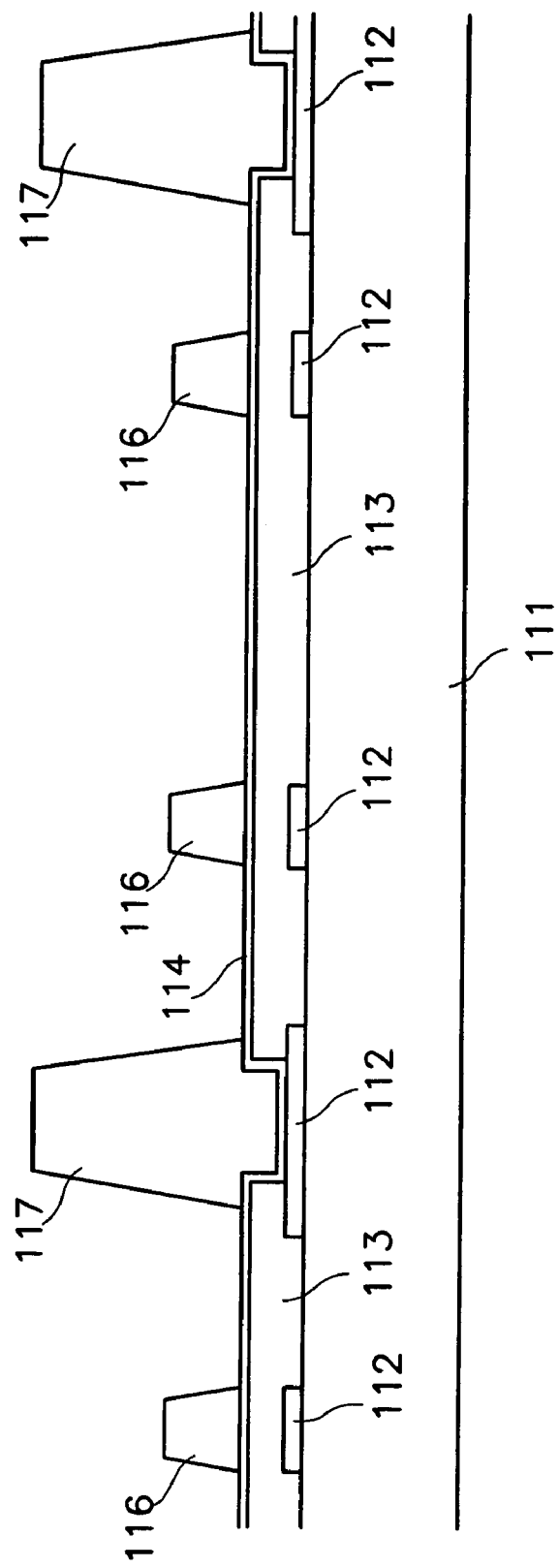
FIG. 11 is a cross sectional view of a color filter substrate for a liquid crystal display according to a sixth preferred embodiment of the present invention.

FIG. 11 is a cross sectional view of a color filter substrate for a liquid crystal display according to a sixth preferred embodiment of the present invention.

As shown in FIG. 11, a black matrix 112 is formed on a substrate 111, and color filters 113 of red, green and blue are formed at the black matrix 112. A common electrode 114 is formed on the color filters 113 with a transparent conductive material such as ITO and IZO. Protrusion patterns 116 and 117 are formed on the common electrode 114 with a photosensitive organic insulating material. The protrusion patterns 116 and 117 are differentiated in thickness such that the protrusion pattern 117 placed over the black matrix 112 has a thickness larger than the protrusion pattern 116 placed over the color filters 113.

Pixel electrodes 104 are formed at the thin film transistor array substrate each with an opening pattern. As shown in FIG. 12A, each pixel electrode 104 is rectangular-shaped with top and bottom sides and left and right sides, and a first opening portion 121 is tapered from the right side of the pixel electrode 104 to the left side at the center thereof. Both inlet edges of the first opening portion are cut, and curved smoothly. The pixel electrode 104 is divided into upper and lower regions around the first opening portion 121. Second and third opening portions 122 and 123 are formed at the upper and the lower regions of the pixel electrode 104. The second and the third opening portions 122 and 123 diagonally proceed from the top and the bottom sides of the pixel electrode 104 toward the left center thereof such that they are symmetrical to each other.

As shown in FIG. 12B, the protrusion pattern 116 formed on the common electrode 114 has first to third protrusions 131 and 141 and 151 differentiated in shape. The first protrusion 131 includes a trunk portion 132, first and second branch portions 133 and 134 proceeding from the trunk portion 132 up and downward in a slant manner, and first and second sub-branch portions 135 and 136 proceeding from the first and second branch portions 133 and 134 up and downward in the vertical direction. The second protrusion 141 includes a first base portion 142 proceeding parallel to the first branch portion 133, a first horizontal limb portion 143 proceeding from the first base portion 142 in the horizontal direction, and a first vertical limb portion 144 proceeding from the first base portion 142 in the vertical direction. The third protrusion 151 is symmetrical to the second protrusion 141. That is, the third protrusion 151 includes a second base portion 152, a second horizontal limb portion 153, and a second vertical limb portion 154. The first to third protrusions 131, 141 and 151 are formed at the region of the common electrode 114 corresponding to each pixel electrode 104. The first to third protrusions 131, 141 and 151 each have a width of 3–15 μm.

Meanwhile, the spacer protrusion pattern 117 bearing a thickness larger than the domain partitioning protrusion pattern 116 is overlapped with the black matrix 112, and shaped with a pillar where the top and the bottom sides thereof are polygon or circle-shaped each with a width of 5–40 μm.

Figure 12C:
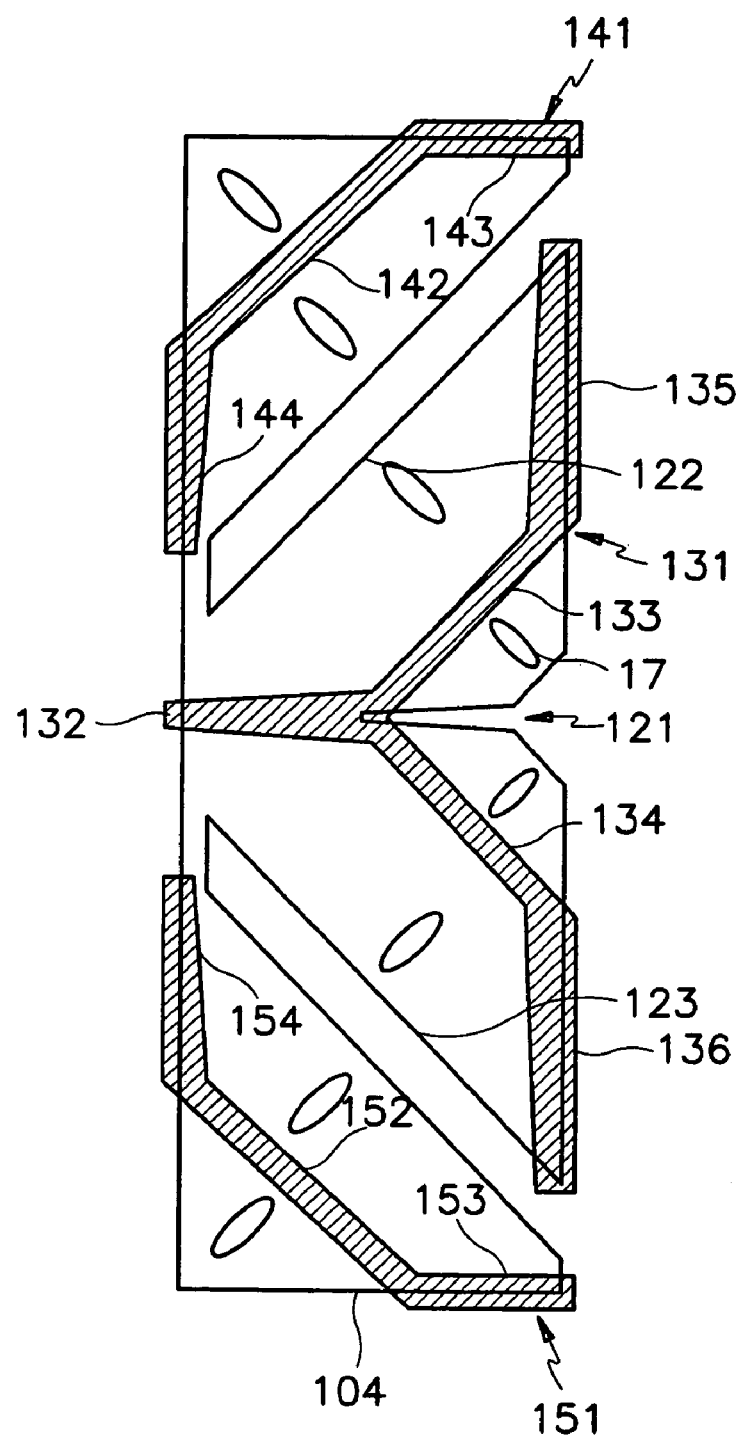
FIG. 12C illustrates the combinatorial state of the pixel electrode shown in FIG. 12A and the protrusion pattern shown in FIG. 12B.

FIG. 12C illustrates the combinatorial state of the opening patterns of the pixel electrode 104 and the protrusion patterns formed on the common electrode 114.

As shown in FIG. 12C, the first to third opening portions 121 to 123 of the pixel electrode 104 are overlapped with the first to third protrusions 131, 141 and 151 formed on the common electrode 114 to thereby divide the pixel region into a plurality of micro-domains. The first to third opening portions 121 to 123 of the pixel electrode 104, and the first to third protrusions 131, 141 and 151 formed on the common electrode 114 are alternately arranged while proceeding parallel to each other except for the first opening portion 121, the trunk portion 132 of the first protrusion 131, and the sub-branch portions 135 and 136 of the first protrusion 131 as well as the horizontal and vertical limb portions 143, 0.144, 153 and 154 of the second and third protrusions 141 and 151 overlapped with the sides of the pixel electrode 104.

Under the application of voltage, the liquid crystal molecules 17 are aligned in four directions while exhibiting wide viewing angle in those directions.

In the above structure, the protrusion pattern 117 with a relatively large thickness is used as a spacer, whereas the protrusion pattern 116 with a relatively small thickness is used for domain partitioning.

A method of fabricating the above-structured color filter substrate will be now explained with reference to FIGS. 13A to 17C.

Figure 13A:
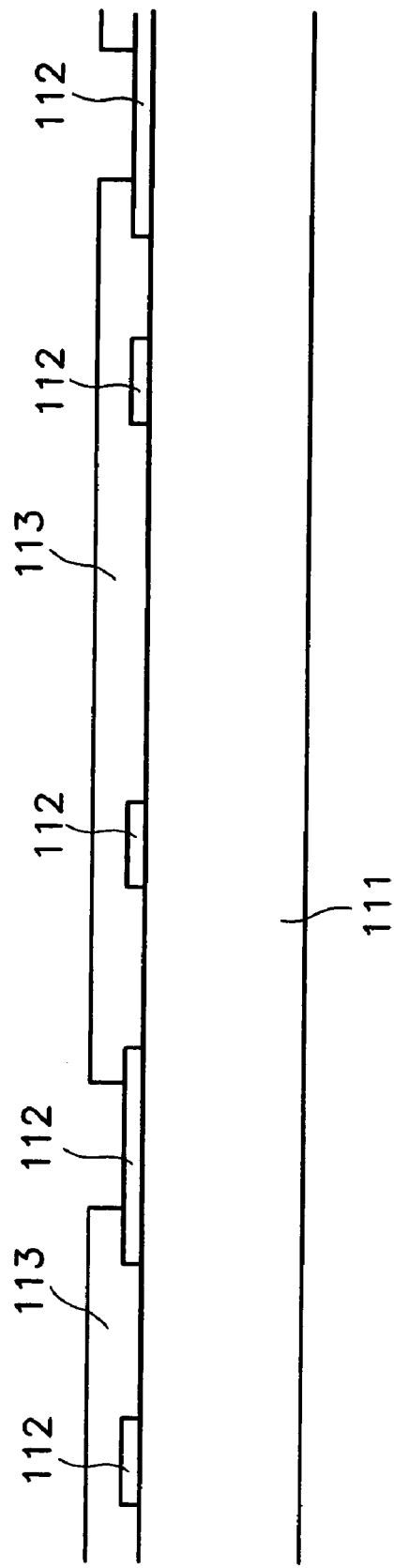

First, as shown in FIG. 13A, a black matrix 112 is formed on an insulating substrate 111, and color filters 113 of red, green and blue are formed at the black matrix 112.

Thereafter, as shown in FIG. 13B, a common electrode 114 is formed on the entire surface of the substrate 111 with a transparent conductive material such as ITO and IZO.

Figure 13C:
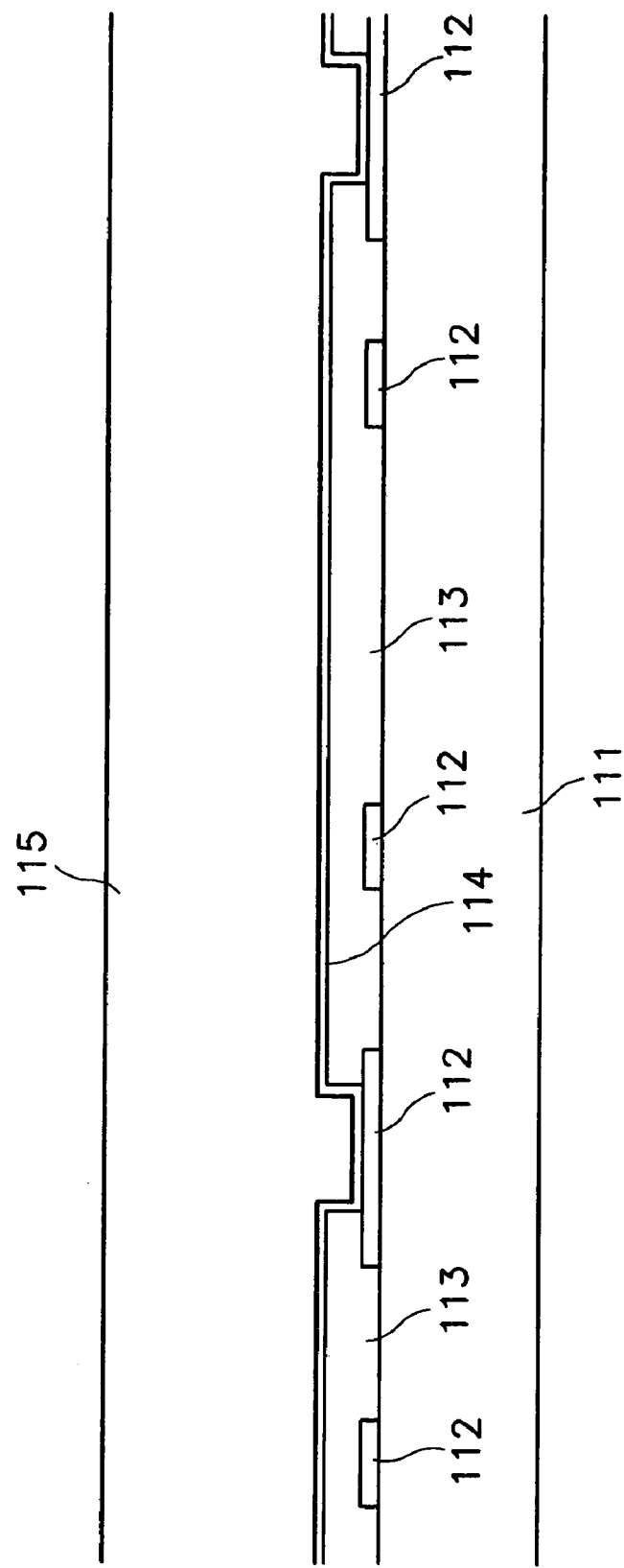

As shown in FIG. 13C, a photosensitive organic insulating film 115 is coated onto the common electrode 115. A negative or positive photoresist film, a silicon-containing insulating film may be used instead of the photosensitive organic insulating film 115.

Figure 15:
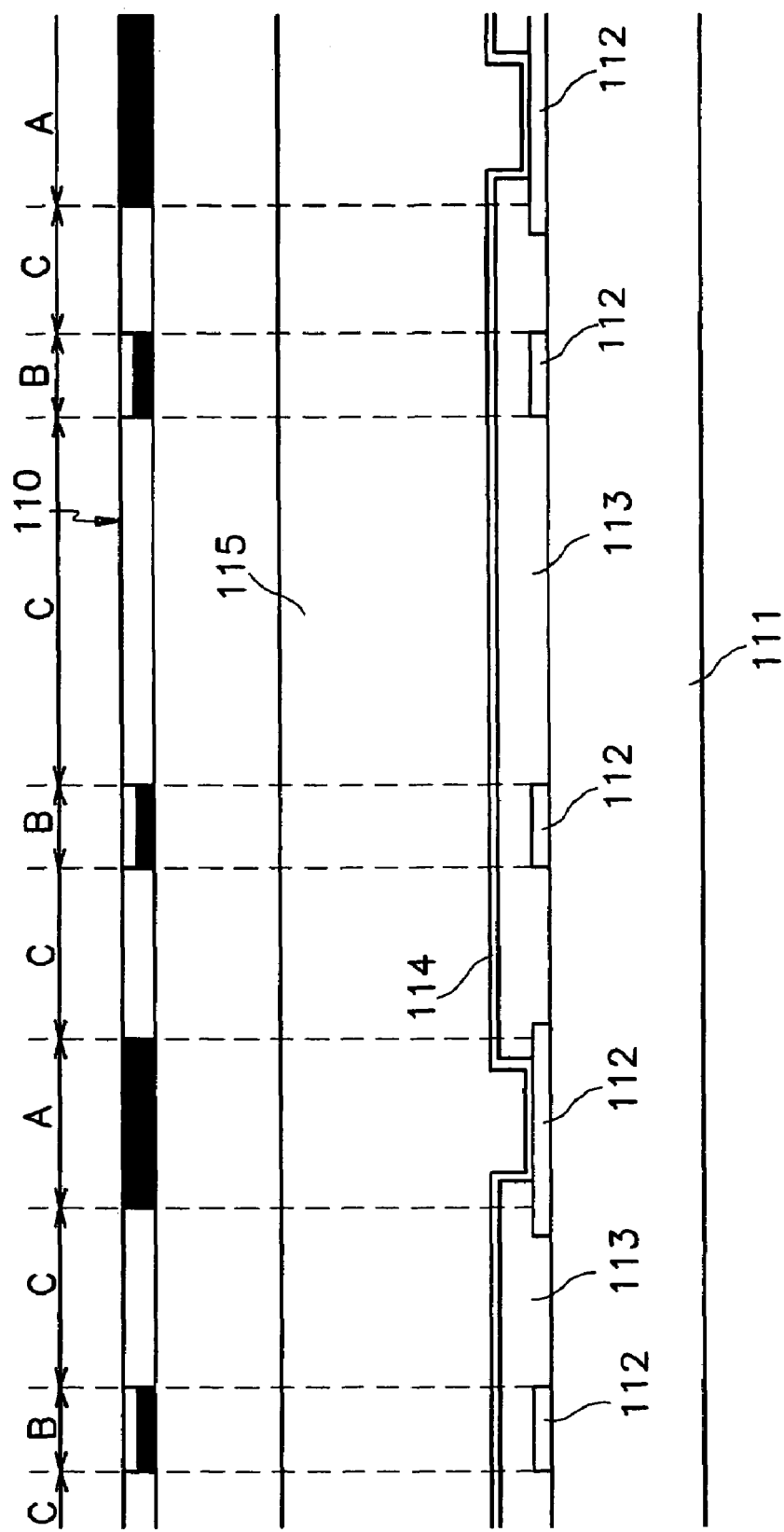

The photosensitive organic insulating film 115 is patterned using a mask 100 or 110 shown in FIG. 14 or 15 to thereby form protrusion patterns 116 and 117 differentiated in thickness, as shown in FIG. 11. It is preferable that the mask includes a slit pattern or a semitransparent film.

A method of forming the protrusion patterns 116 and 117 using a mask with a slit pattern or a semitransparent film will be now explained in detail. Either a negative photosensitive organic insulating film or a positive photosensitive organic insulating film may be used as the target film. In the case of the negative photosensitive organic insulating film, the light-exposed portions are left over after the development, and the portions not exposed to the light are entirely removed.

As shown in FIG. 14, the mask 100 includes a slit pattern to be placed at the B area over the color filters 113, a transparent pattern to be placed at the A area where the common electrode 114 is hollowed while contacting the black matrix 112, and an opaque pattern to be placed at the remaining area C. When the light exposing is made using the mask 100, the amount of light incident upon the target film through the slit pattern is smaller than the amount of light incident upon the target film through the transparent pattern. Accordingly, after the light exposing and the development are completed, as shown in FIG. 11, the protrusion pattern 116 at the B area has a thickness smaller than the protrusion pattern 117 at the A area, and the negative photosensitive insulating film at the C area is removed.

In the case of the negative organic insulating film, after the development, the upper portion thereof is wider than the lower portion thereof while bearing a shape of a counter-taper, but diminished during the subsequent processing steps so that the resulting pattern exhibits a substantially vertical side.

A method of forming the protrusion patterns using a mask with a semitransparent film will be now explained with reference to FIG. 15. Either a negative photosensitive organic insulating film or a positive photosensitive organic insulating film may be used as the target film. In the case of the positive photosensitive organic insulating film, the light-exposed portions are removed after the development, and the portions not exposed to the light are left over.

As shown in FIG. 15, the mask 110 includes a semitransparent pattern to be placed at the B area over the color filters 113, an opaque pattern to be placed at the A area where the common electrode 114 is hollowed while contacting the black matrix 112, and a transparent pattern to be placed at the remaining area C. When the light exposing is made using the mask 110, the amount of light incident upon the target film through the semitransparent pattern is smaller than the amount of light incident upon the target film through the transparent pattern. Accordingly, after the light exposing and the development are completed, the positive organic insulating film remained at the B area has a thickness smaller than the positive organic insulating film remained at the A area, and the positive organic insulating film at the C area is entirely removed.

In case a negative organic insulating film is used as the target film, it is difficult to make the portion covered by the semitransparent film bear the desired thickness. Therefore, it is preferable to use a positive organic insulating film as the target film.

As described above, protrusion patterns 116 and 117 differentiated in thickness are formed using a mask 100 or 110 with a slit pattern or a semitransparent film. The protrusion pattern 116 bearing a relatively small thickness forms fringe fields while serving to obtain wide viewing angle. The protrusion pattern 117 bearing a relatively large thickness is used as a spacer. The protrusion patterns 116 and 117 may be formed through one photolithography process.

Meanwhile, a silicon-containing insulating film may be used instead of the photosensitive organic insulating film. The silicon-containing insulating film is first coated as the, target film, and a photoresist film is coated onto the silicon-containing insulating film. Thereafter, the target film overlaid with the photoresist film suffers photolithography based on a mask with a slit pattern, or a semitransparent film. A positive photoresist film may be used for the patterning. This process will be now explained with reference to FIGS. 16 to 17C.

Figure 17A:
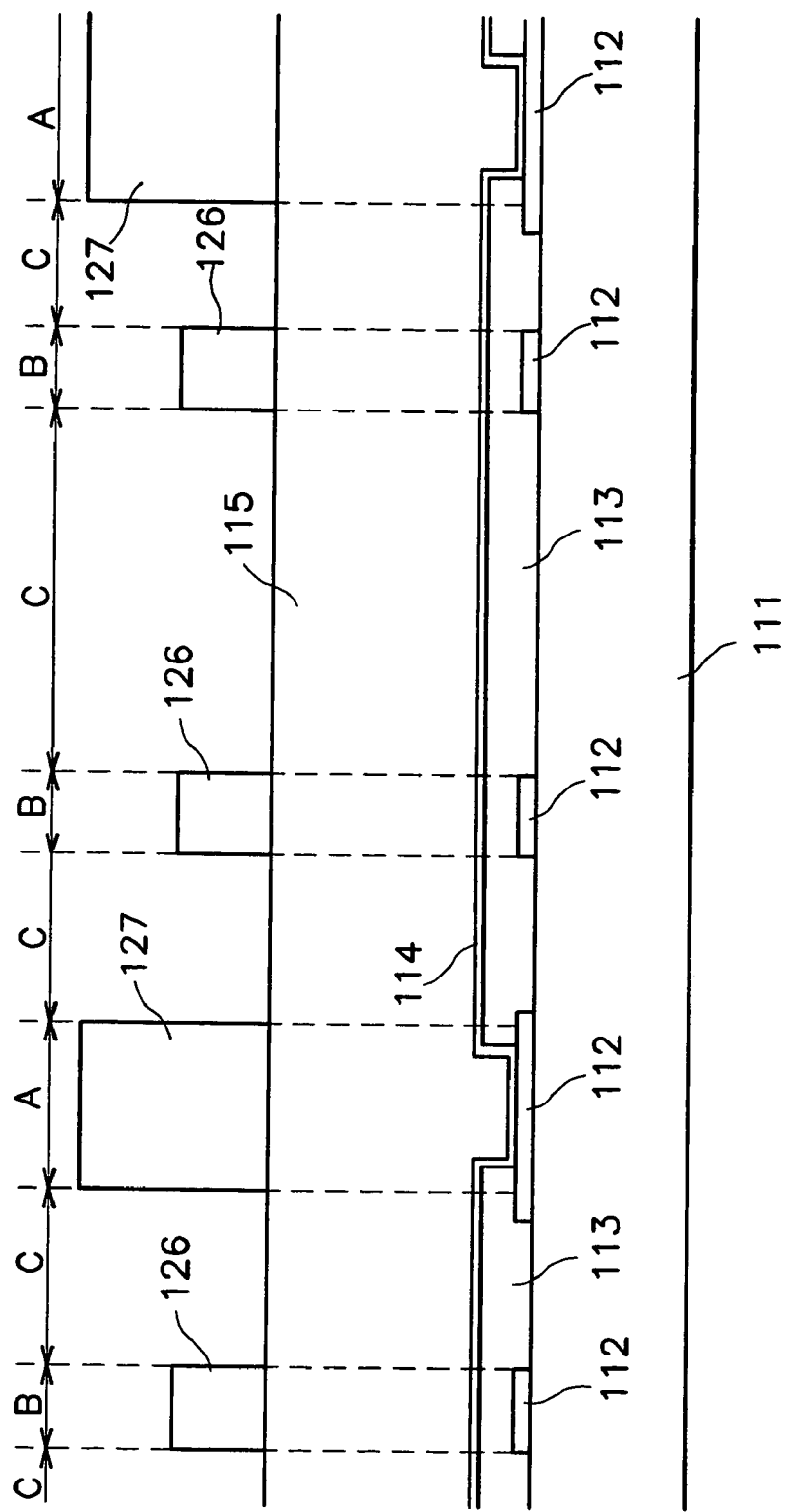
FIGS. 17A to 17C sequentially illustrate the steps of fabricating the color filter substrate shown in FIG. 11 after the formation of a photoresist pattern.

As shown in FIG. 16, a photoresist film 125 is coated onto the silicon-containing insulating film 115. The photoresist film 125 is exposed to light through a mask 120, and developed to thereby form photoresist patterns 126 and 127 differentiated in thickness, as shown in FIG. 17A. The mask 120 includes a slit pattern to be placed at the B area, an opaque pattern to be placed at the A area, and a transparent pattern to be placed at the C area. When the photoresist film 125 is exposed to light through the mask 120 and developed, the photoresist film remained at the B area has a thickness smaller than the photoresist film remained at the A area, and the photoresist film at the C area is entirely removed. A semitransparent pattern may be used instead of the slit pattern. In case a negative photoresist film is used instead of the positive photoresist film, the mask may be provided with a transparent pattern to be placed at the A area, and an opaque pattern to be placed at the C area.

Figure 17B:
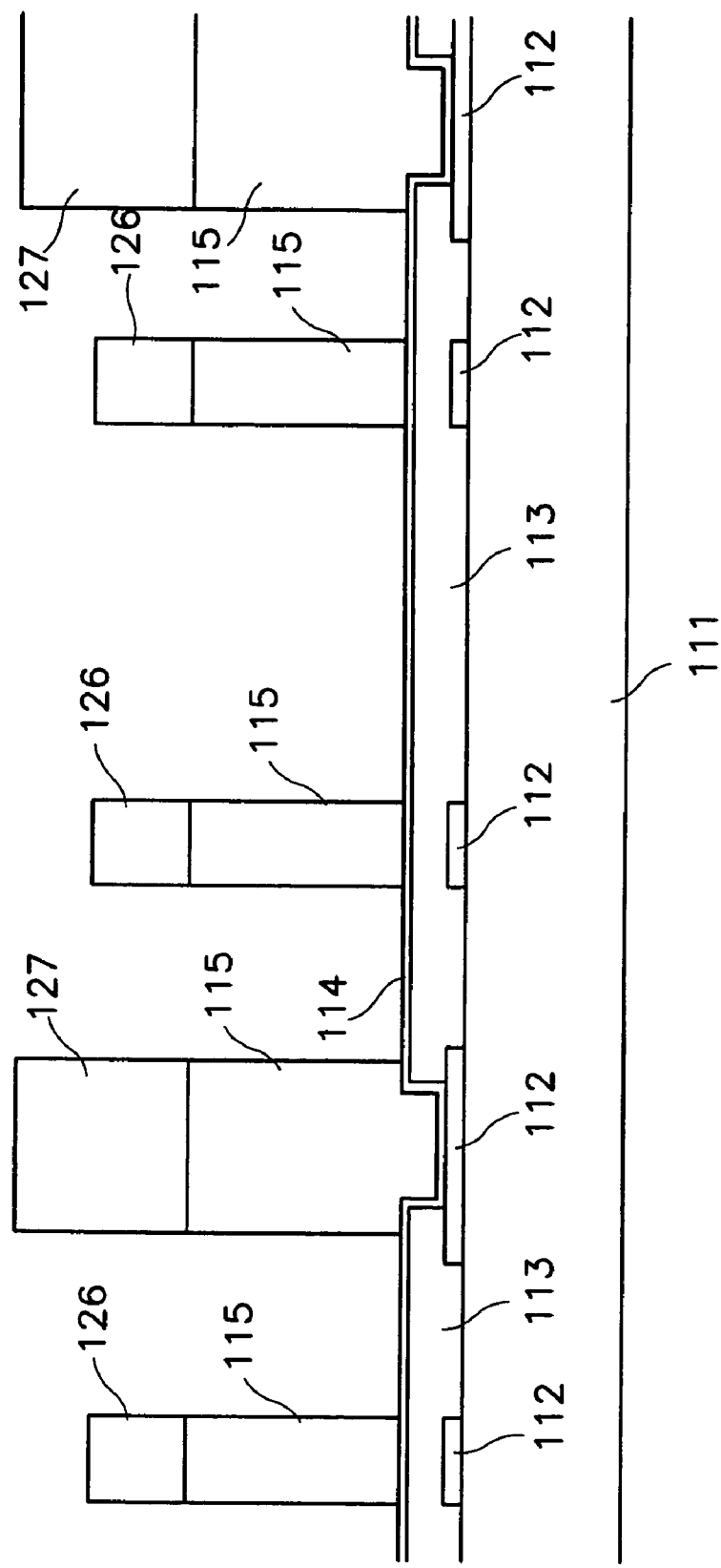

Thereafter, as shown in FIG. 17B, the portions of the insulating film 115 exposed through the photoresist patterns 126 and 127 are etched such that the underlying common electrode 114 is exposed to the outside.

Figure 17C:
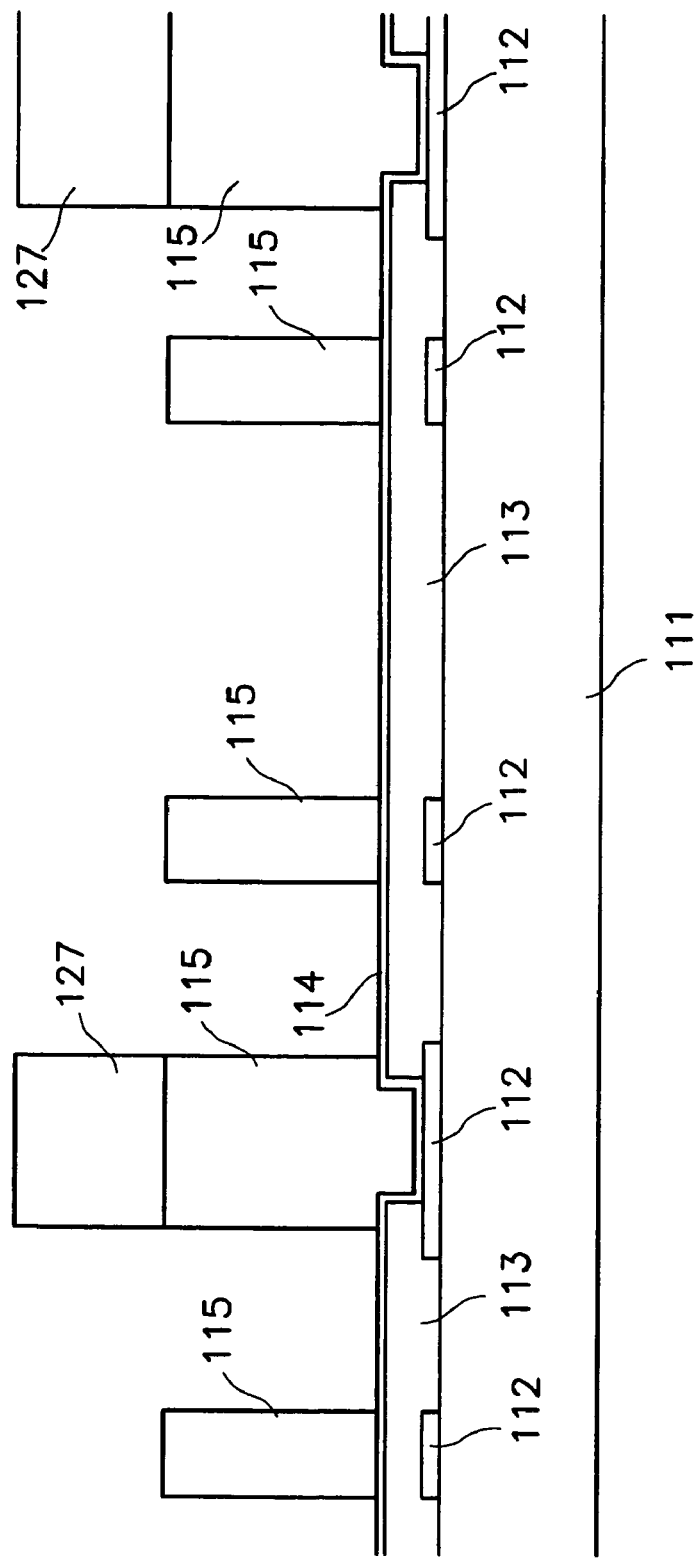

As shown in FIG. 17C, when the photoresist patterns 126 and 127 are etched while exposing the underlying insulating film 115, only the photoresist pattern 127 placed at the A area is left over. When the photoresist pattern 127 is removed, as shown in FIG. 11, the protrusion patterns 116 and 117 differentiated in thickness are completed.

Figure 18C:
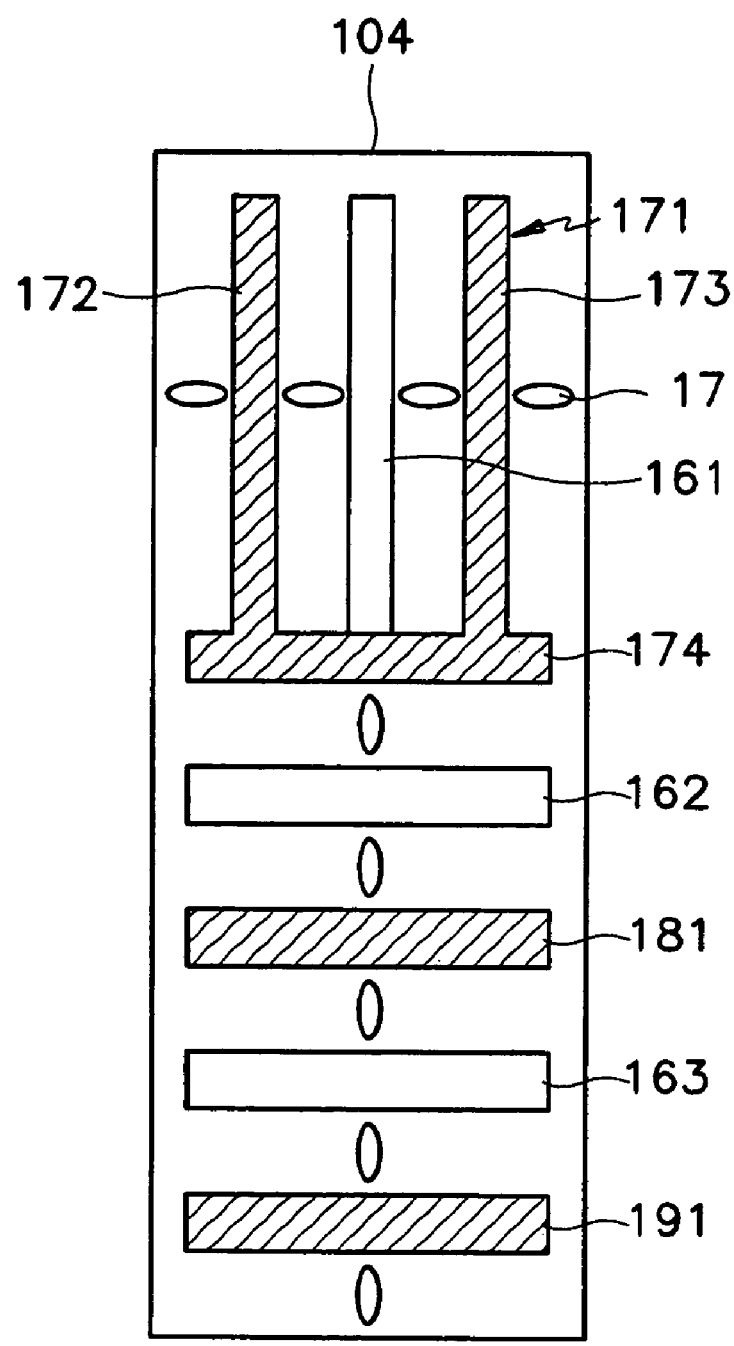
FIG. 18C illustrates the combinatorial state of the pixel electrode shown in FIG. 18A and the protrusion pattern shown in FIG. 18B.

FIGS. 18A to 18C illustrate a liquid crystal display according to a seventh preferred embodiment of the present invention. In this preferred embodiment, other components and structures of the liquid crystal display are the same as those related to the sixth preferred embodiment except for the shape of the pixel electrode 104 and the protrusion pattern.

As shown in FIG. 18A, the pixel electrode 104 has an upper half region and a lower half region, and a first rectangular-shaped opening portion 161 bisects the upper half region of the pixel electrode 104 left and right. Second and third rectangular-shaped opening portions 162 and 163 trisect the lower half region of the pixel electrode 104 up and down.

As shown in FIG. 18B, the common electrode 114 is overlaid with a protrusion pattern having first to third protrusions 171, 181 and 191. The first protrusion 171 includes first and second trunk portions 172 and 173 proceeding in the vertical direction parallel to each other, and a branch portion 174 connected to the first and second trunk portions 172 and 173 while proceeding in the horizontal direction. The second and the third protrusions 181 and 191 are placed below the first and second trunk portions 172 and 173 while proceeding in the horizontal direction parallel to each other.

FIG. 18C illustrates the combinatorial state of the opening pattern of the pixel electrode 104 and the protrusion pattern formed on the common electrode 114.

As shown in FIG. 18C, the first opening portion 161 of the pixel electrode 104 and the first and second trunk portions 172 and 173 of the common electrode 114 vertically partition the upper half region of the pixel electrode 104 into four micro-domains. The second and third opening portions 162 and 163 of the pixel electrode 104 and the second and third protrusions 181 and 191 of the common electrode 114 horizontally partition the lower half region of the pixel electrode 104 into five micro-domains.

As described above, pillar-shaped protrusion patterns are formed on a common electrode to make the desired pixel-domain partitioning as well as to be used as a spacer. Furthermore, a λ/4 plate and a bi-axial film are provided between the top substrate and the polarizing plate and between the bottom substrate and the polarizing plate such that the circular-polarized light passes the liquid crystal, thereby removing the undesirable textures while enhancing the brightness. Furthermore, the protrusion patterns differentiated in thickness are formed through one photolithography process such that the protrusion pattern bearing a relatively small thickness is used for the domain partitioning, and the protrusion pattern bearing a relatively large thickness is used as a spacer.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for manufacturing a liquid crystal display (LCD), comprising the steps of:
    forming a color filter layer on a substrate;
    forming a conductive layer on the color filter layer;
    forming an insulating layer on the conductive layer;
    forming a photoresist layer on the insulating layer; and
    patterning the insulating layer and the photoresist layer to form a protrusion and a spacer taller than the protrusion.

2. The method of claim 1, wherein the step of patterning the insulating layer and the photoresist layer comprising steps of:
    preparing a mask having an opaque area, a semitransparent area and a transparent area on predetermined areas thereof;
    exposing the photoresist layer to a light beam through the mask;
    developing the photoresist layer to expose portions of the insulating layer; and
    etching the exposed portions of the insulating layer.

3. The method of claim 2, wherein the insulating layer contains silicon.

4. The method of claim 1, further comprising a step of forming a black matrix layer on the substrate, wherein the spacer overlaps the black matrix layer.

5. The method of claim 1, wherein the spacer comprise the insulating layer and the photoresist layer.

6. A method for manufacturing a liquid crystal display (LCD), comprising steps of:
    forming a black matrix layer on a first substrate, the black matrix layer comprising a first black matrix pattern surrounding a pixel region and a second black matrix pattern formed within the pixel region;
    forming a color filter layer on the black matrix layer;
    forming a conductive layer on the color filter layer; and
    forming a protrusion on a portion of the conductive layer corresponding to the second black matrix pattern, the protrusion having a height to maintain a predetermined gap between the first substrate and a second substrate facing the first substrate.

7. The method of claim 6, wherein the height of the protrusion ranges between 3.0 µm and 4.5 µm.

8. The method of claim 6, wherein the protrusion is pillar-shaped.

9. The method of claim 8, wherein a top surface and a bottom surface of the protrusion have a circular or rectangular shape or a rectangular shape with curved edges.

10. The method of claim 6, wherein the protrusion formed of a photosensitive material, positive or negative photoresist or an insulating material containing silicon.

11. The method of claim 6, wherein the pixel region is divided into a plurality of sub-regions and the protrusion is formed within each sub-region.

12. The method of claim 11, wherein the protrusion is formed at the center of each sub-region.

13. The method of claim 6, wherein the protrusion is in contact with a pixel electrode of the second substrate to maintain the predetermined gap between the first substrate and the second substrate.

14. The method of claim 5, wherein the protrusion comprises the insulating layer.

* * * * *